United States Patent
Aomatsu et al.

(10) Patent No.: US 11,280,677 B2
(45) Date of Patent: Mar. 22, 2022

(54) COLORIMETER CAPABLE OF TAKING A FIXED POSTURE WITH RESPECT TO A MEASUREMENT OBJECT

(71) Applicant: KONICA MINOLTA, INC., Chiyoda-ku (JP)

(72) Inventors: Hiroki Aomatsu, Sakai (JP); Shinichi Iida, Sakai (JP); Wataru Yamaguchi, Sakai (JP); Yoshitaka Teraoka, Suita (JP); Yoshihisa Abe, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 41 days.

(21) Appl. No.: 16/316,727

(22) PCT Filed: Jul. 5, 2017

(86) PCT No.: PCT/JP2017/024594
§ 371 (c)(1),
(2) Date: Jan. 10, 2019

(87) PCT Pub. No.: WO2018/012358
PCT Pub. Date: Jan. 18, 2018

(65) Prior Publication Data
US 2019/0154508 A1    May 23, 2019

(30) Foreign Application Priority Data
Jul. 14, 2016 (JP) .............................. JP2016-139118

(51) Int. Cl.
*G01J 3/50* (2006.01)
*G01N 21/25* (2006.01)
(Continued)

(52) U.S. Cl.
CPC ............. *G01J 3/502* (2013.01); *G01J 3/0218* (2013.01); *G01J 3/0267* (2013.01); *G01J 3/10* (2013.01);
(Continued)

(58) Field of Classification Search
CPC .. G01J 3/502; G01J 3/50; G01J 3/0267; G01J 3/465; G01J 3/0218; G01J 3/504; G01J 3/10; G01N 21/251; G01N 21/255
See application file for complete search history.

(56) References Cited

U.S. PATENT DOCUMENTS

2006/0114465 A1    6/2006    Hart et al.

FOREIGN PATENT DOCUMENTS

| CN | 103492845 | 1/2014 |
|----|-----------|--------|
| JP | 7-294334  | 11/1995 |

(Continued)

OTHER PUBLICATIONS

International Search Report issued in the corresponding application PCT/JP2017/024594.

(Continued)

*Primary Examiner* — Hwa Andrew Lee
(74) *Attorney, Agent, or Firm* — Cozen O'Connor

(57) ABSTRACT

Colorimeter having first and second illumination units disposed symmetrically to a reference line in a prescribed plane, first and second light-receiving parts disposed symmetrically to the reference line in the prescribed plane, a calculation unit for determining color information about a measurement object, and an opposing wall that opposes the measurement object when it is measured. The opposing wall has an abutting part that abuts the measurement object when it is measured. The abutting part has a pair of first abutting parts disposed on two sides of a measurement opening to flank the measurement opening; and a pair of second abutting parts disposed on an orthogonal line orthogonal to a first-abutting-part connection line that connects the pair of first abutting parts to each other, the pair of second abutting (Continued)

parts being disposed on two sides of the first-abutting-part connection line to flank the first-abutting-part connection line.

15 Claims, 15 Drawing Sheets

(51) Int. Cl.
*G01J 3/02* (2006.01)
*G01J 3/46* (2006.01)
*G01J 3/10* (2006.01)

(52) U.S. Cl.
CPC .............. *G01J 3/465* (2013.01); *G01J 3/50* (2013.01); *G01J 3/504* (2013.01); *G01N 21/251* (2013.01); *G01N 21/255* (2013.01)

(56) References Cited

FOREIGN PATENT DOCUMENTS

| | | |
|---|---|---|
| JP | H 07-294334 | 11/1995 |
| JP | 10-281874 | 10/1998 |
| JP | H 10-281874 | 10/1998 |
| JP | 2000-088651 | 3/2000 |
| JP | 2008-076399 | 4/2008 |
| WO | WO 2011/142107 | 11/2011 |
| WO | WO 2012/147488 | 11/2012 |
| WO | WO 2015/182380 | 12/2015 |

OTHER PUBLICATIONS

Written Opinion issued in the corresponding application PCT/JP2017/024594.
Office Action dated Apr. 13, 2020 issued in Chinese Patent Application No. 201780042899.5.
Office Action dated Nov. 6, 2020 issued in Japanese Patent Application No. 2018-527535.
Office Action dated May 12, 2021 issued in Japanese Patent Application No. 2018-527535.

ONE SIDE OF GEOMETRY OF DOUBLE-PASS CORRECTION

COLORIMETER CAPABLE OF TAKING A FIXED POSTURE WITH RESPECT TO A MEASUREMENT OBJECT

RELATED APPLICATIONS

This is a U.S. National Phase Application under 35 USC 371 of International Application PCT/JP2017/024594 filed on Jul. 5, 2017.

This application claims the priority of Japanese application no. 2016-139118 filed Jul. 14, 2016, the entire content of which is hereby incorporated by reference.

TECHNICAL FIELD

The present invention relates to a colorimeter for performing colorimetry of a measurement object.

BACKGROUND ART

Metallic coating and pearl color coating used for coating automobiles and the like contain flake-like aluminum pieces and mica pieces called brilliant materials in a coating film, and exhibit so-called metallic effect and pearl effect. These effects are attributable to the fact that the contribution of the brilliant materials to the reflection characteristics varies depending on the illumination and the observation direction. Apparatuses for evaluating (measuring color of) such metallic coating and pearl color coating have been known in the past.

For example, Patent Literature 1 discloses an apparatus for finding out characteristics of a surface of a measurement object. In the apparatus disclosed in Patent Literature 1, for example, while a planar bottom wall on which a measurement opening is formed abuts a surface of the measurement object, the surface of the measurement object is indirectly illuminated by an illumination device via the measurement opening and light from the surface is received to find out characteristics of the surface of the measurement object.

In Patent Literature 1, however, since the bottom wall to be caused to abut the surface of the measurement object is formed in a planar shape, as illustrated in FIG. 22 as an example, in a case where a measurement object S has a curved surface like a bumper of an automobile, it is difficult for an apparatus 1000 to take a fixed posture with respect to the measurement object S when a bottom wall 1001 of the apparatus 1000 is brought into contact with the surface of the measurement object S, such that there is a case where the bottom wall 1001 at the position of a center axis O of the measurement opening is lifted with respect to the measurement object S and the bottom wall 1001 is kept separated from the measurement object S by a distance L. As a result, the measurement value fluctuates with each measurement. In addition, the apparatus 1000 is sometimes inclined with respect to the measurement object and has difficulties in performing accurate colorimetry.

CITATION LIST

Patent Literature

Patent Literature 1: JP 2008-76399 A

SUMMARY OF INVENTION

The present invention has been made in view of the above circumstances and an object of the present invention is to provide a colorimeter capable of taking a fixed posture with respect to a measurement object at the time of measurement, decreasing the possibility of fluctuations in measurement value, and performing more accurate colorimetry.

In order to realize at least one of the above-mentioned objects, a colorimeter reflecting one mode of the present invention is provided with first and second illumination units disposed symmetrically with respect to a reference line in a prescribed plane, first and second light-receiving parts disposed symmetrically with respect to the reference line in the prescribed plane, a calculation unit for determining color information about a measurement object, and an opposing wall that opposes the measurement object when the measurement object is to be measured. The opposing wall is provided with an abutting part that abuts the measurement object when the measurement object is measured. The abutting part is provided with: a pair of first abutting parts disposed on two sides of a measurement opening so as to flank the measurement opening; and a pair of second abutting parts disposed on an orthogonal line that is orthogonal to a first-abutting-part connection line that connects the pair of first abutting parts to each other, the pair of second abutting parts being disposed on two sides of the first-abutting-part connection line so as to flank the first-abutting-part connection line.

Advantages and features implemented by one or more embodiments of the invention are fully understood from the detailed description given below and the accompanying drawings. These detailed description and accompanying drawings are given only by way of example and are not intended as a definition of the limitation of the invention.

DESCRIPTION OF EMBODIMENTS

Figure 1:
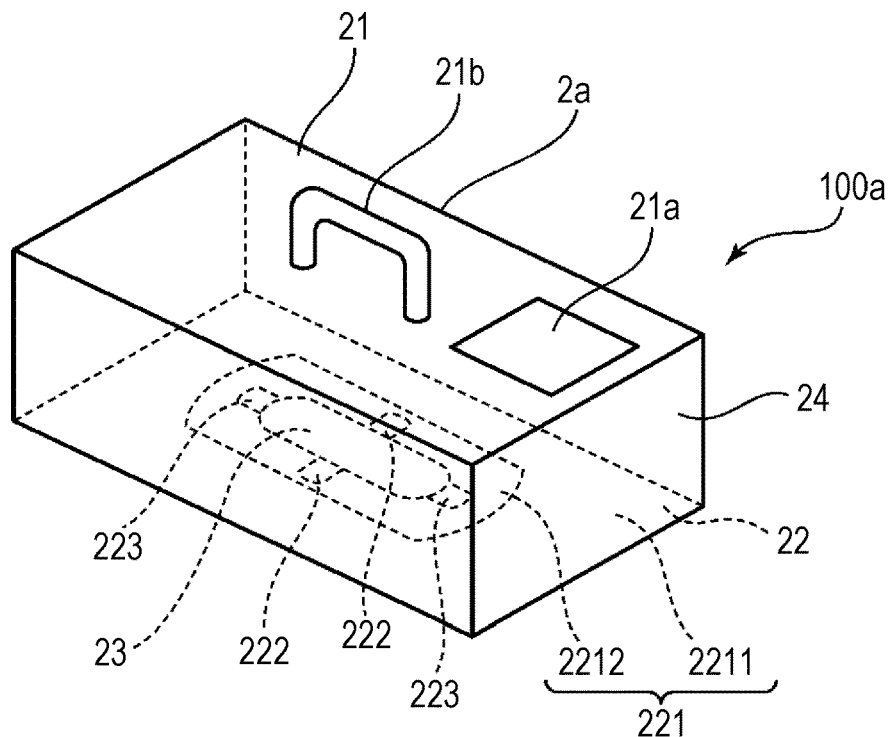
FIG. 1 is a perspective view of a colorimeter according to a first embodiment.

One or more embodiments of the present invention will be described below with reference to the drawings. However, the scope of the invention is not limited to the disclosed embodiments. Note that constitutions denoted by the same reference numerals in each drawing indicate that these constitutions have the same configuration and description thereof is omitted appropriately. In the present specification, in the case of collectively referring to constitutions, reference numerals without suffixes are used and, in the case of referring to the individual constitutions, reference numerals with suffixes are used.

First Embodiment

Figure 2:
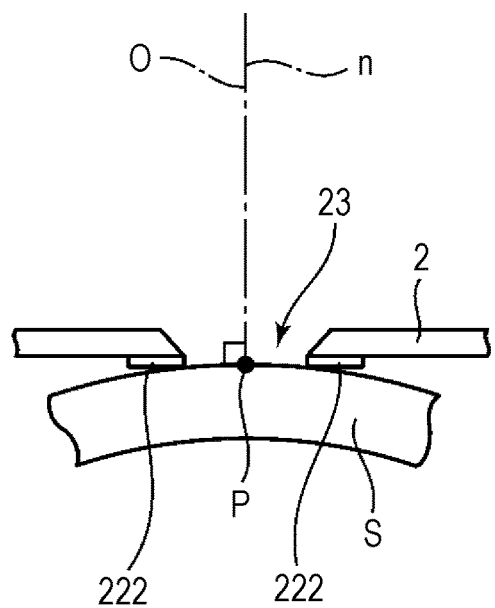
FIG. 2 is a schematic diagram for explaining a positional relationship between the colorimeter in FIG. 1 and a measurement surface of a measurement object at the time of measurement.
Figure 3:
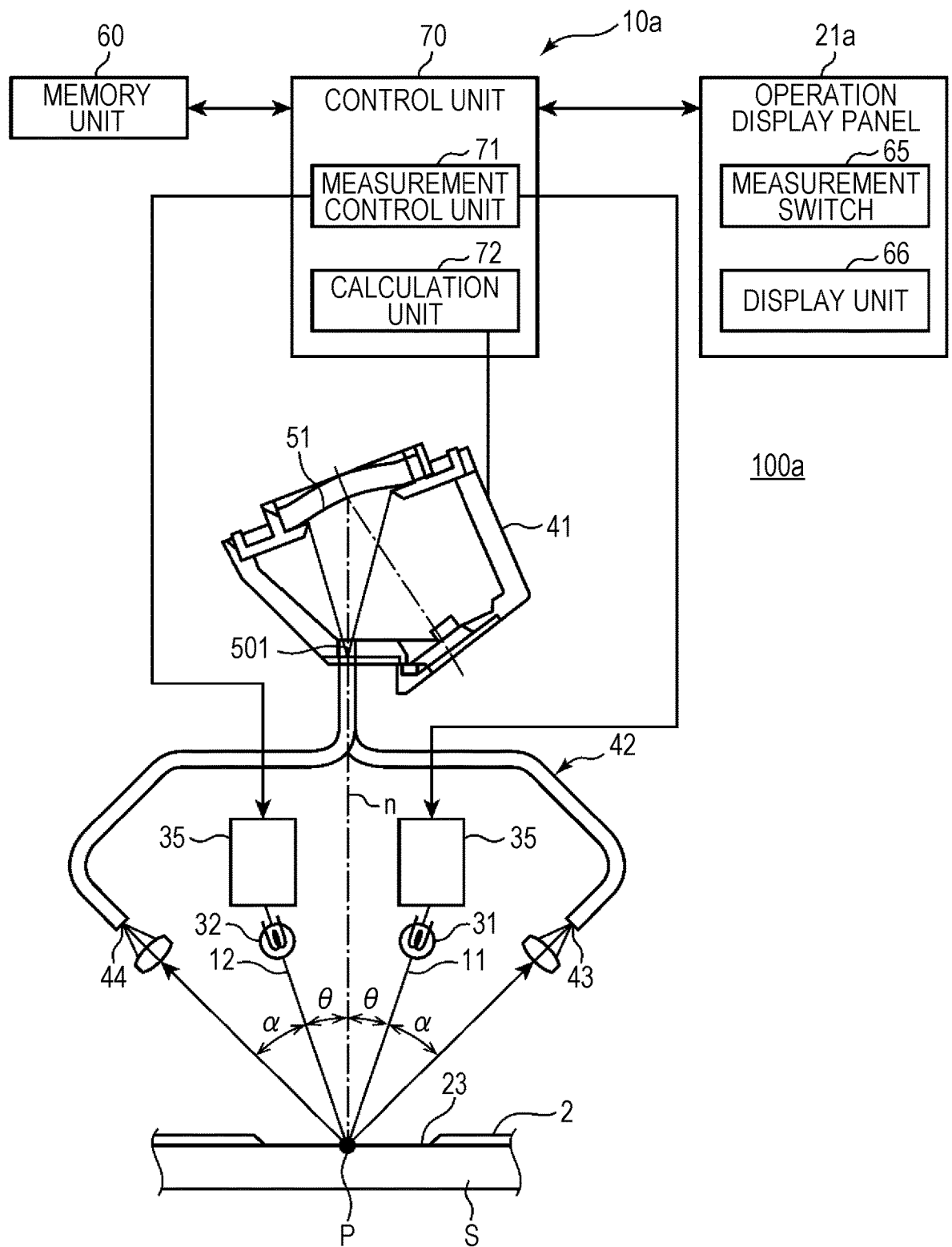
FIG. 3 is a configuration diagram of a colorimeter main body included in the colorimeter in FIG. 1.
Figure 4:
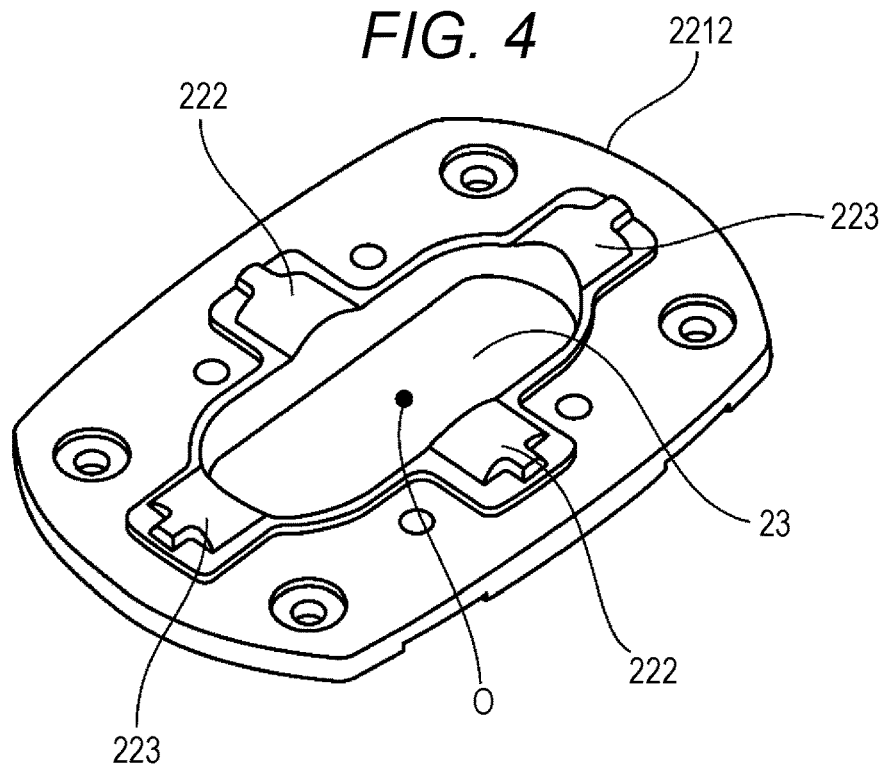
FIG. 4 is a perspective view of a mounting wall part provided on a bottom wall of the colorimeter in FIG. 1.
Figure 5:
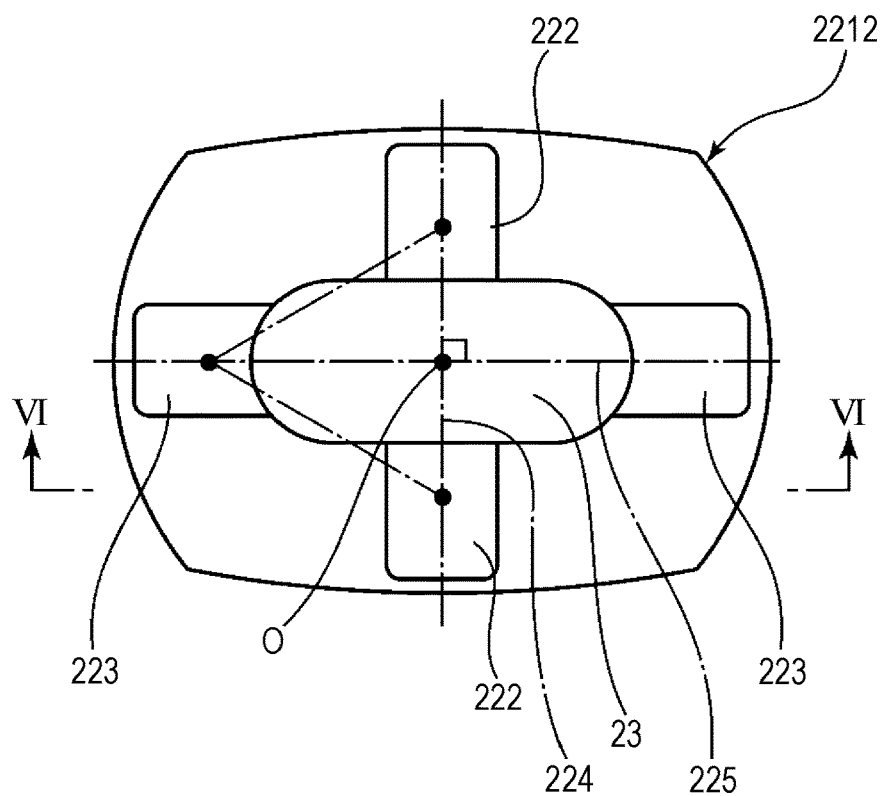
FIG. 5 is a bottom view of the mounting wall part in FIG. 4.
Figure 6:
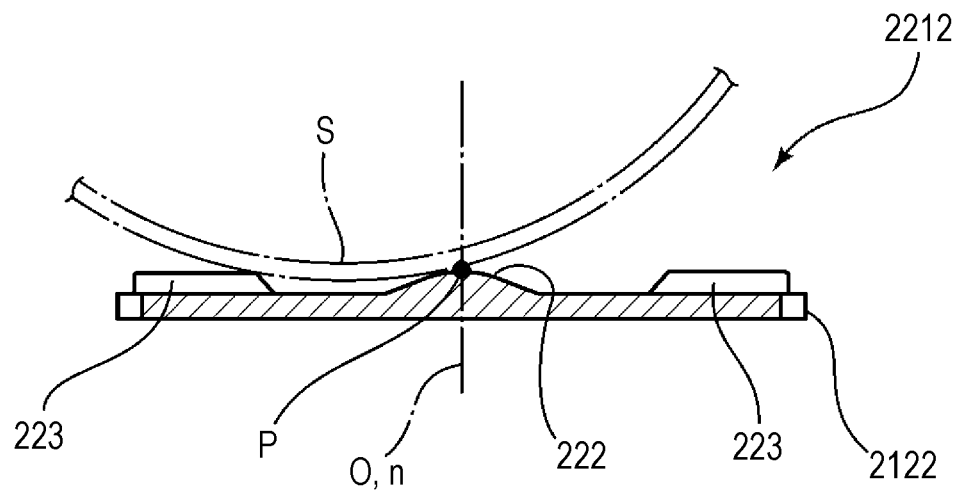
FIG. 6 is a cross-sectional view taken along line VI-VI in FIG. 5.

FIG. 1 is a perspective view of a colorimeter according to a first embodiment. FIG. 2 is a schematic diagram for explaining a positional relationship between the colorimeter in FIG. 1 and a measurement surface of a measurement object at the time of measurement. FIG. 3 is a configuration diagram of a colorimeter main body included in the colorimeter in FIG. 1. FIG. 4 is a perspective view of a mounting wall part provided on a bottom wall of the colorimeter in FIG. 1. FIG. 5 is a bottom view of the mounting wall part in FIG. 4. FIG. 6 is a cross-sectional view taken along line VI-VI in FIG. 5.

The colorimeter 100a of a first embodiment is a colorimeter that performs a so-called double-pass correction process and, as illustrated in FIGS. 1 to 6, is provided with a colorimeter main body 10a (see FIG. 3) and a casing 2a that houses the colorimeter main body 10a.

The casing 2a is constituted by a box-like body having an upper wall 21, a bottom wall 22 and four side walls 24. On the upper wall 21, there are provided an operation display panel 21a provided with a display unit 66 (see FIG. 3) that indicates the measurement result, a measurement switch 65 (see FIG. 3), and the like, and a grip part 21b, such that the colorimeter 100a can be carried by being gripped on the grip part 21b.

The bottom wall 22 is a member that serves as an opposing wall that opposes a measurement object S when the measurement object S is measured (see FIG. 2), and is provided with an opposing wall main body 221, and abutting parts 222 and 223 formed on the opposing wall main body 221 so as to protrude from the opposing wall main body 221 toward the side of the measurement object S to be opposed at the time of measurement, such that the abutting parts 222 and 223 abut the measurement object S when the measurement object S is measured.

In this embodiment, the opposing wall main body 221 is configured from a peripheral wall part 2211 and a mounting wall part 2212 mounted on the peripheral wall part 2211 by bolts.

As illustrated in FIGS. 4 to 6, a measurement opening 23 having a long-hole shape facing the measurement object S when the measurement object S is measured is formed in the mounting wall part 2212. In more detail, the measurement opening 23 is shaped into a rectangle with rounded corners (track shape of athletics field, elliptical shape) constituted by two parallel lines having equal lengths and two semicircles disposed at each of two ends of the two parallel lines and coupled to each of the two ends. In this embodiment, a center axis O of the measurement opening 23 is formed so as to coincide with the center axis of the casing 2a.

The abutting parts 222 and 223 are provided with a pair of first abutting parts 222 and a pair of second abutting parts 223 formed on a peripheral edge portion of the measurement opening 23 in the mounting wall part 2212. In this embodiment, the first abutting parts 222 are formed as a pair on two sides of the measurement opening 23 in a width direction orthogonal to a longitudinal direction so as to flank the center axis O of the measurement opening 23. The second abutting parts 223 are formed as a pair on a center orthogonal line 225 orthogonal to a first-abutting-part connection line 224 that connects the pair of first abutting parts 222 to each other, on two sides of the first-abutting-part connection line 224 so as to flank the first-abutting-part connection line 224, where the center orthogonal line 225 passes through the center of the first-abutting-part connection line 224 (the center axis O of the measurement opening 23).

In this embodiment, the first abutting parts 222 and the second abutting parts 223 are each formed in an arcuate surface shape constituted by a part of the circumferential surface of a columnar body. Note that the shapes of the first abutting parts 222 and the second abutting parts 223 are not particularly limited and may be, for example, hemispherical or pyramidal; the shapes can be changed appropriately.

As illustrated in FIG. 3, the colorimeter main body 10a is provided with illumination units 31 and 32, light-receiving parts 43 and 44, a control unit 70, and a memory unit 60.

The illumination units 31 and 32 are provided with a first illumination unit 31 and a second illumination unit 32. The first illumination unit 31 and the second illumination unit 32 are each configured from, for example, a light source constituted by a xenon flash lamp, a regulating plate that regulates a light ray from the light source, and a collimating lens (not illustrated). Light-emitting circuits 35 that cause the light sources to emit light are arranged in the vicinity of each of the first illumination unit 31 and the second illumination unit 32.

The light-emitting circuit 35 has, for example, a main capacitor for applying a direct current high voltage of several hundred volts to an electrode of the light source, a charging circuit for charging the main capacitor, and a trigger generation circuit for applying an alternating current high voltage of tens of thousands of volts to a trigger electrode constituted by a metal wire wound around the light source in close contact therewith; additionally the light-emitting circuit 35 has a semiconductor switching element constituted by, for example, an insulated gate bipolar transistor (IGBT), and a driving circuit for applying a driving voltage to the semiconductor switching element.

Then, when the alternating current high voltage is instantly applied to the trigger electrode via a trigger transformer by a trigger capacitor of the trigger generation circuit while the semiconductor switching element is turned on and the direct current high voltage is applied to the electrodes at two ends of the light source by the main capacitor, the light source is triggered and emits light as the direct current flows from the main capacitor. Thereafter, by turning off the semiconductor switching element at a desired timing, light emission can be stopped.

The regulating plate is disposed such that an opening of the regulating plate coincides with the focal point of the collimating lens. Light rays from the light source that have transmitted the opening of the regulating plate are collimated by the collimating lens to form parallel light rays and, at a prescribed incident angle with respect to a reference line n intersecting with an opening plane of the measurement opening 23 (in this embodiment, the reference line n coincides with the center axis O of the measurement opening 23 orthogonal to the opening plane), radiate illumination light toward an intersection point P between the opening plane and the reference line n.

Additionally, the first illumination unit 31 is adapted to radiate first illumination light 11 toward the intersection point P between the opening plane and the reference line n at a prescribed first incident angle A with respect to the prescribed reference line n intersecting with the opening plane of the measurement opening 23. Note that, in the description of the present application, the angle from the reference line n to the clockwise side in FIG. 3 is defined as plus and the angle from the reference line n to the counter-clockwise direction in FIG. 3 is defined as minus.

The second illumination unit 32 is disposed diametrically opposite to a first disposing position of the first illumination unit 31 with respect to the reference line n and symmetrically with the first illumination unit 31 with the reference line n as a line of symmetry, and is adapted to radiate second illumination light 12 toward the intersection point P at a second incident angle $-\theta$ having a magnitude $|-\theta|$ equal to a magnitude $|+\theta|$ of the first incident angle $\theta$.

The light-receiving parts 43 and 44 are provided with a first light-receiving part 43 and a second light-receiving part 44, a single light detection unit 41, and a bifurcated optical fiber 42 for introducing light into the light detection unit 41.

The first light-receiving part 43 and the second light-receiving part 44 are formed on respective branched lower end surfaces of the optical fiber 42 and are disposed symmetrically with regard to the reference line n.

In more detail, the first light-receiving part 43 and the second light-receiving part 44 are disposed in a plane including the first disposing position of the first illumination unit 31, the reference line n, and a second disposing position of the second illumination unit 32. The first light-receiving part 43 is adapted to receive light from the intersection point P by facing the intersection point P at a prescribed first observation angle $(\theta+\alpha)$ with respect to the reference line n. Therefore, the intersection point P serves as a measurement point of the measurement object S. The intersection point P is set so as to coincide with a cross point between the center axis O of the measurement opening 23 and the center orthogonal line 225.

Meanwhile, the second light-receiving part 44 is disposed symmetrically with the first light-receiving part 43 in the plane with the reference line n as a line of symmetry, and is adapted to receive light from the intersection point P at a second incident angle $-(\theta+\alpha)$ having a magnitude $|-(\theta+\alpha)|$ equal to a magnitude $|\theta+\alpha|$ of the first observation angle $(\theta+\alpha)$.

Furthermore, in this embodiment, micro lenses for efficiently focusing reflected light from the measurement object S on the respective first light-receiving part 43 and second light-receiving part 44 are disposed on distal end sides of the first light-receiving part 43 and the second light-receiving part 44.

The branches of the optical fiber 42 are brought into proximity to each other to be parallel in an upper part and these upper distal ends are disposed toward an entrance slit 501 provided in the light detection unit 41. However, the entrance slit 501 is not adapted to blend light from the respective branches of the optical fiber 42. Therefore, light passing through each branch of the optical fiber 42 enters the light detection unit 41 in a spatially distinct state from each other.

The light detection unit 41 is provided with a photoelectric conversion element (not illustrated) that is supplied with light received by each of the first light-receiving part 43 and the second light-receiving part 44 via optical path constituents such as the optical fiber 42 and an optical diffraction module, to convert spectral components of these rays of light into electrical signals.

The control unit 70 is provided with electronic circuits such as a central processing unit (CPU) and an analog/digital converter (A/D converter), and is provided with a measurement control unit 71 and a calculation unit 72 as functional blocks, to control the movement of each member of the colorimeter 100a in accordance with a control program saved in the memory unit 60.

When the measurement switch 65 is operated, the measurement control unit 71 causes the respective light sources of the first illumination unit 31 and the second illumination unit 32 to sequentially emit light and to perform colorimetry. The measurement control unit 71 displays a computation result of the calculation unit 72 on the display unit 66 as a measurement result.

On the basis of the electrical signals converted by the light detection unit 41, the calculation unit 72 determines each of first and second detection values (spectral reflection characteristics) of light received from the respective first light-receiving part 43 and second light-receiving part 44 and, on the basis of the detection values, obtains color information (for example, tristimulus values) about the measurement surface present at the measurement point (intersection point P). In addition, in this embodiment, the calculation unit 72 executes a double-pass correction process of averaging information on the reflected light acquired independently by the respective first light-receiving part 43 and second light-receiving part 44 that are optically disposed symmetrically with each other. The double-pass correction process will be further described later.

The memory unit 60 is provided with a random access memory (RAM), an electrically erasable programmable read only memory (EEPROM), and the like, to temporarily retain measurement results and the like and to store the control program for causing the control unit 70 to move as described later.

Figure 7:
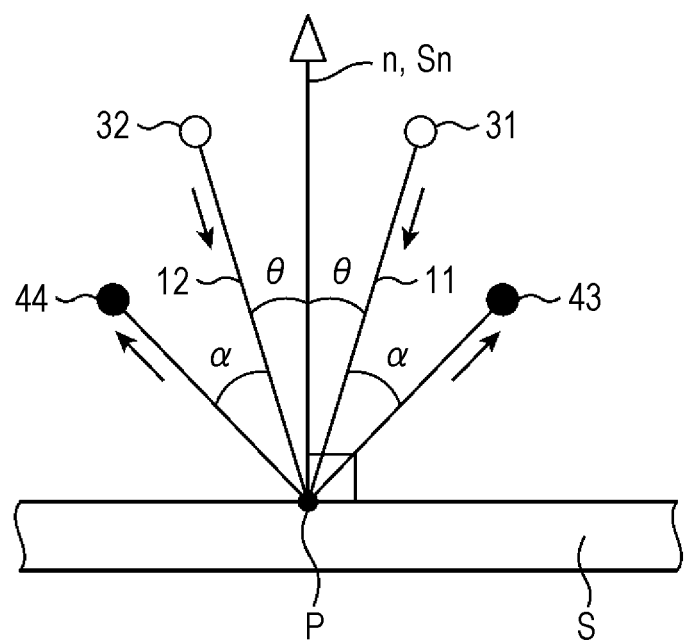
FIG. 7 is a diagram illustrating a positional relationship between an optical system and a measurement surface of a measurement object in a case where a reference line and a normal of the measurement surface coincide with each other.
Figure 8:
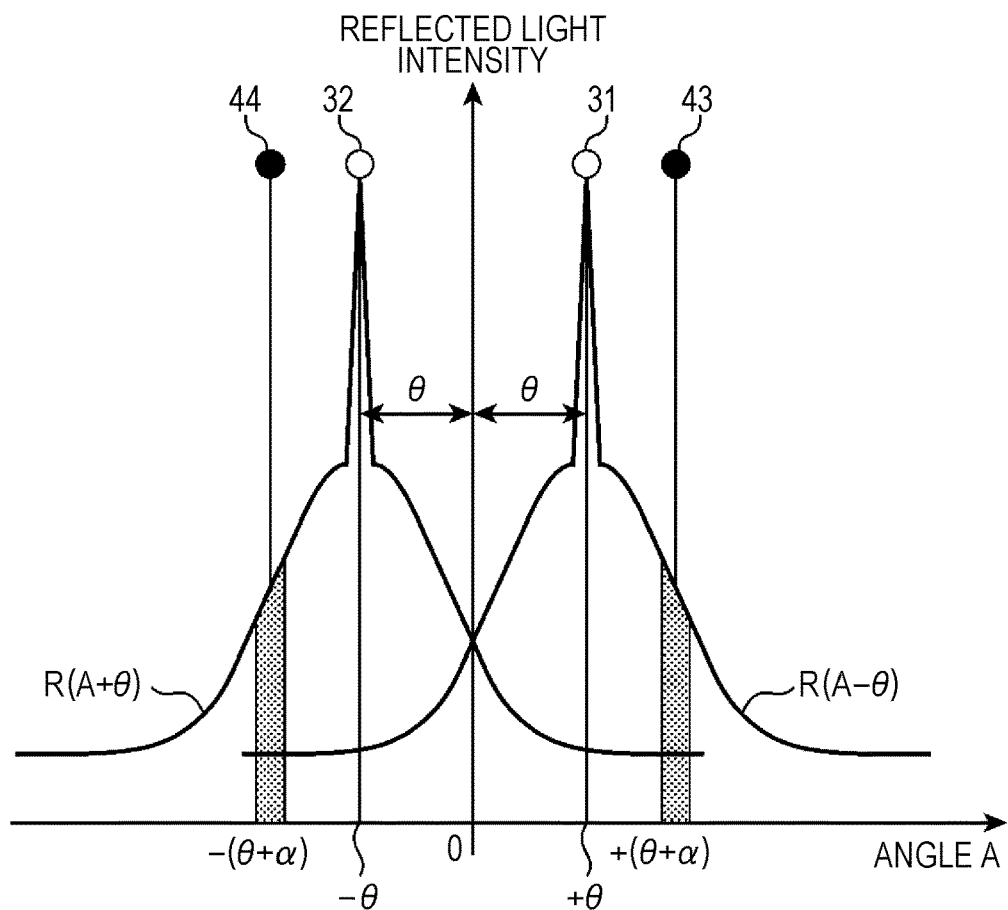
FIG. 8 is a graph illustrating reflected light intensity when the optical system and the measurement surface have the positional relationship in FIG. 7.
Figure 9:
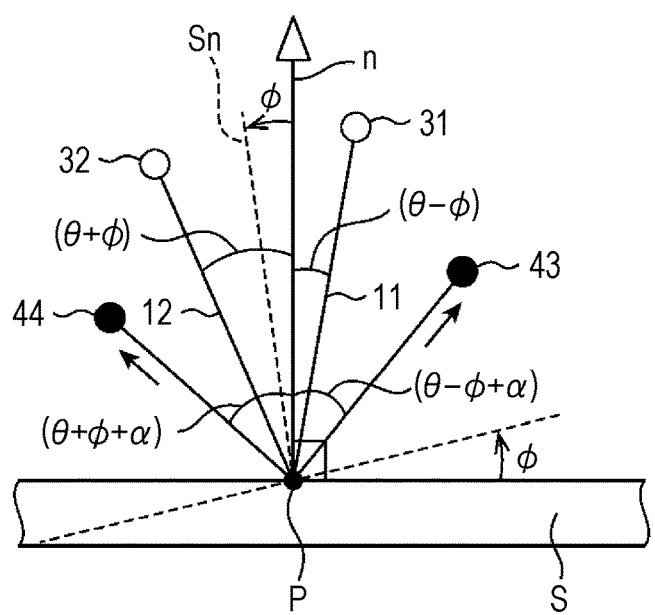
FIG. 9 is a diagram illustrating a positional relationship between the optical system and a measurement surface of a measurement object in a case where the reference line is inclined with respect to a normal of the measurement surface.
Figure 10:
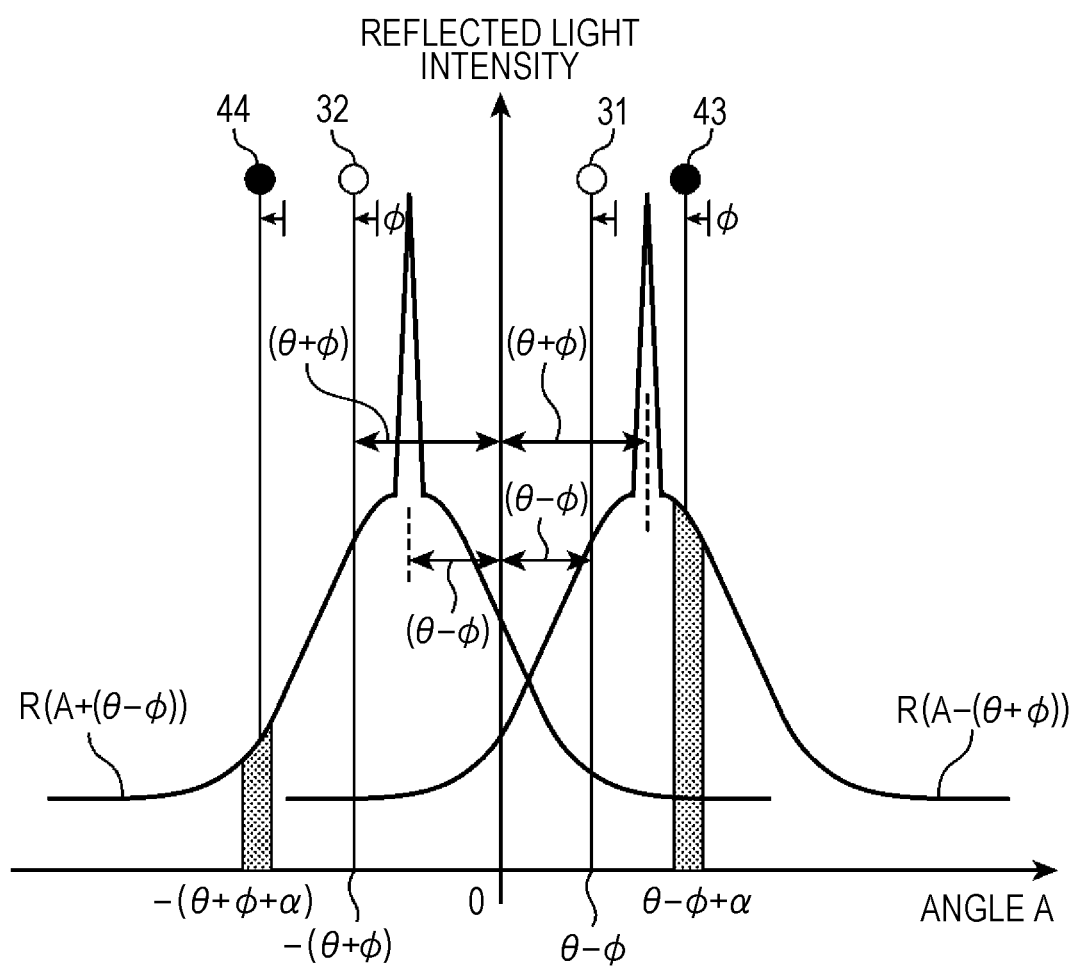
FIG. 10 is a graph illustrating reflected light intensity when the optical system and the measurement surface have the positional relationship in FIG. 9.

Next, the movement of the colorimeter 100a of the first embodiment will be described. FIG. 7 is a diagram illustrating a positional relationship between the optical system and the measurement surface of a measurement object in a case where the reference line and a normal of the measurement surface coincide with each other. FIG. 8 is a graph illustrating reflected light intensity when the optical system and the measurement surface have the positional relationship in FIG. 7. FIG. 9 is a diagram illustrating a positional relationship between the optical system and a measurement surface of a measurement object in a case where the reference line is inclined with respect to a normal of the measurement surface. FIG. 10 is a graph illustrating reflected light intensity when the optical system and the measurement surface have the positional relationship in FIG. 9.

The bottom wall 22 is caused to oppose the measurement object S such that the measurement point of the measurement object S is located within the measurement opening 23. In this state, for example, when the measurement object S has a curved surface as illustrated in FIG. 6, the pair of first abutting parts 222 and one second abutting part 223 (in FIG. 6, the second abutting part 223 on the left) are caused to abut the measurement object S. Note that, in FIG. 3, the first abutting parts 222 and the second abutting parts 223 are omitted. These abutting parts in FIGS. 11, 12, and 13 to be described later are also omitted from illustration.

In this state, since a line connecting the pair of first abutting parts 222 and the one second abutting part 223 is in the form of a triangle (see FIG. 5), the measurement object S is abutted in a fixed posture. Therefore, a distance between the position of the center axis O of the measurement opening 23 (the above-mentioned intersection point P) in the bottom wall 22 and the measurement point of the measurement object S is kept fixed (zero in this embodiment) and, unlike the conventional product not having the first abutting parts 222 and the second abutting parts 223 in the bottom wall, it is possible to prevent the position of the center axis of the measurement opening 23 from being lifted off the measurement object S due to being unstable with respect to the measurement object S and a distance between the position of the center axis of the measurement opening in the bottom wall 22 and the measurement object S from being produced.

In this state, the first illumination unit 31 and the second illumination unit 32 are sequentially caused to emit light such that the light is cast on the measurement object S. Then, the reflected light from the measurement object S is received by the first light-receiving part 43 and the second light-receiving part 44 and these rays of light are directed to the light detection unit 41 to be subjected to diffraction spectroscopy. Consequently, although a symmetrical disposition technique is employed, spectroscopy and light detection for color evaluation are performed by the single light detection unit 41. In particular, spectroscopy can be performed by a single concave diffraction grating 51. Since the single light detection unit 41 is shared (commonly utilized) in the two symmetrical measurement systems, compared with a case where the light detection units are individually provided in the two measurement systems, detection errors due to individual differences in characteristics of the two light detection units can also be prevented.

Then, on the basis of the electrical signals converted by the light-detection unit 41, the calculation unit 72 determines each of first and second detection values (spectral reflection characteristics) of light received by the respective first light-receiving part 43 and second light-receiving part 44 and, on the basis of the detection values, performs the double-pass correction process to obtain color information (for example, tristimulus values) about the measurement surface present at the measurement point. Although the double-pass correction process is disclosed, for example, in JP 5737390 B2, more specifically, it is as follows.

For example, when measurement is performed in an inclined posture in which the reference line n and a normal Sn of the measurement object S do not coincide with each other (see FIGS. 7 to 10), it is impossible to precisely obtain the color information present at the measurement point (intersection point P) of the measurement object, from the measurement information by only the first light-receiving part 43 or the second light-receiving part 44. However, in the present embodiment, even when the reference line n and the normal Sn do not coincide with each other, the first light-receiving part 43 and the second light-receiving part 44 that are optically disposed symmetrically with each other independently acquire information on reflected light, such that the total amount of received light can be regarded as being substantially not affected if the tilt of the colorimeter 100a is relatively small. Accordingly, this posture error can be reduced by the double-pass correction process that performs averaging.

In more detail, when the measurement object S has a curved measurement surface like a bumper of an automobile, since it is difficult to make the center axis of the casing 2a, that is, the reference line n and the normal Sn of the measurement surface accurately coincident with each other, in general, the reference line n often does not coincide with the normal Sn of the measurement surface and a tilted state with respect to the normal Sn of the measurement surface is brought about.

FIGS. 7 to 10 are diagrams for explaining the relationship of angles between the reference line n and the normal Sn of measurement surface of the measurement object S. FIG. 7 is a diagram illustrating a positional relationship between the optical system and the measurement surface in a case where the reference line n and the normal Sn of the measurement surface of the measurement object S coincide with each other.

As illustrated in FIG. 7, when the illumination light 11 is radiated from the first illumination unit 31 in a direction inclined by the angle θ from the normal Sn, the illumination light 11 is reflected at the measurement point (intersection point P) of the measurement surface and is received by the first light-receiving part 43 in a direction inclined by the angle $+(\theta+\alpha)$ from the normal Sn or by the second light-receiving part 44 in a direction inclined by the angle $-(\theta+\alpha)$ from the normal Sn. Meanwhile, also in a case where the illumination light 12 is radiated from the second illumination unit 32 in a direction inclined by the angle $-\theta$) from the normal Sn, the illumination light 12 is reflected at the measurement point of the measurement surface and is received by the first light-receiving part 43 or the second light-receiving part 44.

FIG. 8 is a graph illustrating reflected light intensity when the optical system and the measurement surface have the positional relationship in FIG. 7. Note that the vertical axis denotes reflected light intensity and the horizontal axis denotes an angle A with respect to the normal Sn.

As illustrated in FIGS. 7 and 8, each ray of specularly reflected light of the illumination light 11 and the illumination light 12 from the illumination units 31 and 32 is sent out in a direction that is axisymmetric with each illumination light with respect to the normal Sn. That is, the specularly reflected light of the illumination light 11 is sent out in such a direction that an angle at which the second illumination unit 32 is positioned is given as $-\theta$, and the specularly reflected light of the illumination light 12 is sent out in such a direction that an angle at which the first illumination unit 31 is positioned is given as +θ. Meanwhile, reflected light is produced not only at the central peak position of the specularly reflected light but also at other angles and, in terms of the relationship between the reflected light intensity and the angle A, a distribution as illustrated in FIG. 8 is indicated. Specifically, there are the following three types of constituent factors of reflection characteristics and the reflection characteristics are worked out by the sum of (i) to (iii) below.

(i) A sharp peak is obtained in the angle of specularly reflected light, (ii) it is possible to make an approximation by a Gaussian function having symmetrical attenuation characteristics at angles on two sides having a symmetrical positional relationship with a peak angle of the specularly reflected light as the center, and (iii) the reflection characteristics of diffuse light can be regarded as substantially fixed regardless of the angle.

Note that the proportion of the component (ii) is larger at an angle relatively close to the specularly reflected light, while the proportion of the component (iii) is larger at an angle relatively far from the specularly reflected light.

That is, the reflected light intensity for the illumination light 11 from the first illumination unit 31 can be approximated to a reflection characteristic R(A+θ), while the reflected light intensity for the illumination light 12 from the second illumination unit 32 can be approximated to a reflection characteristic R(A−θ) (see FIG. 8). Therefore, the reflected light intensity of the first light-receiving part 43 at the angle (θ+α) is given as R(+α) and the reflected light intensity of the second light-receiving part 44 at the angle −(θ+α) is given as R(−α); accordingly, for the diagonally shaded areas indicating these amounts of light, the relationship of R(−α)=R(+α) holds.

On the other hand, FIG. 9 is a diagram illustrating a positional relationship between the optical system and the measurement surface in a case where the center axis of the casing 2a, that is, the reference line n is inclined in an angle −φ direction with respect to the normal Sn of the measurement surface. As illustrated in FIGS. 9 and 10, when the reference line n is inclined in the angle −φ direction with respect to the normal Sn, the position of the first illumination unit 31 is inclined from the angle +(θ) to the angle +(θ−φ) with respect to the normal Sn, and the position of the second illumination unit 32 is inclined from the angle −(θ) to the angle −(θ+φ) with respect to the normal Sn; at the same time, the position of the first light-receiving part 43 is inclined from the angle +(θ+α) to the angle +(θ+α−φ) with respect to the normal Sn, and the position of the second light-receiving part 44 is inclined from the angle −(θ+α) to the angle −(θ+φ+α) with respect to the normal Sn.

FIG. 10 is a graph illustrating reflected light intensity in a case where light is radiated while the optical system and the measurement surface have the positional relationship in FIG. 9. As illustrated in FIG. 10, the reflected light intensity for the illumination light 11 from the first illumination unit 31 can be approximated to a reflection characteristic R(A+(θ−φ)), while the reflected light intensity for the illumination light 12 from the second illumination unit 32 can be approximated to a reflection characteristic R(A−(θ+φ)). Therefore, the reflected light intensity of the first light-receiving part 43 at the angle +(θ+α−φ) is given as R(α−2φ) and the reflected light intensity of the second light-receiving part 44 at the angle −(θ+φ+α) is given as R(−α−2φ); accordingly, the diagonally shaded areas indicating these amounts of light have the relationship of R(α−2φ)≠R(−α−2φ).

As indicated by FIGS. 8 and 10, when the center axis O of the casing 2a is inclined in the angle +φ direction with respect to the normal Sn of the measurement surface, the amount of light received by the first light-receiving part 43 is large, whereas the amount of light received by the second light-receiving part 44 is small, compared with a case where the center axis O and the normal Sn coincide with each other. However, in terms of the total amount of received light, substantially equal results are obtained in each case and the relationship of R(−α)+R(+α)=R(α−2φ)+R(−α−2φ) is approximately established. The above is a description of the double-pass correction process.

As described above, in the colorimeter 100a according to the first embodiment, when the measurement object S is measured, the pair of the first abutting parts 222 and the second abutting part 223 abut the measurement object S. Consequently, for example, even when the measurement object S has a curved surface, the measurement object S can be kept abutted in a fixed posture at all times and lifting off the measurement object S can be prevented with the first abutting parts 222. Furthermore, for example, even in a case where the colorimeter 100a is inclined with respect to the measurement object S when the measurement object S has a curved surface, more accurate colorimetry is possible by the so-called double-pass correction in which colorimetry and averaging are performed on the basis of reflected light information obtained with a symmetrical optical disposition. Therefore, in the colorimeter 100a according to the first embodiment, the possibility of fluctuations in measurement value can be decreased even in a plurality of measurements and more accurate colorimetry is possible.

Next, another embodiment will be described.

Second Embodiment

Figure 11:
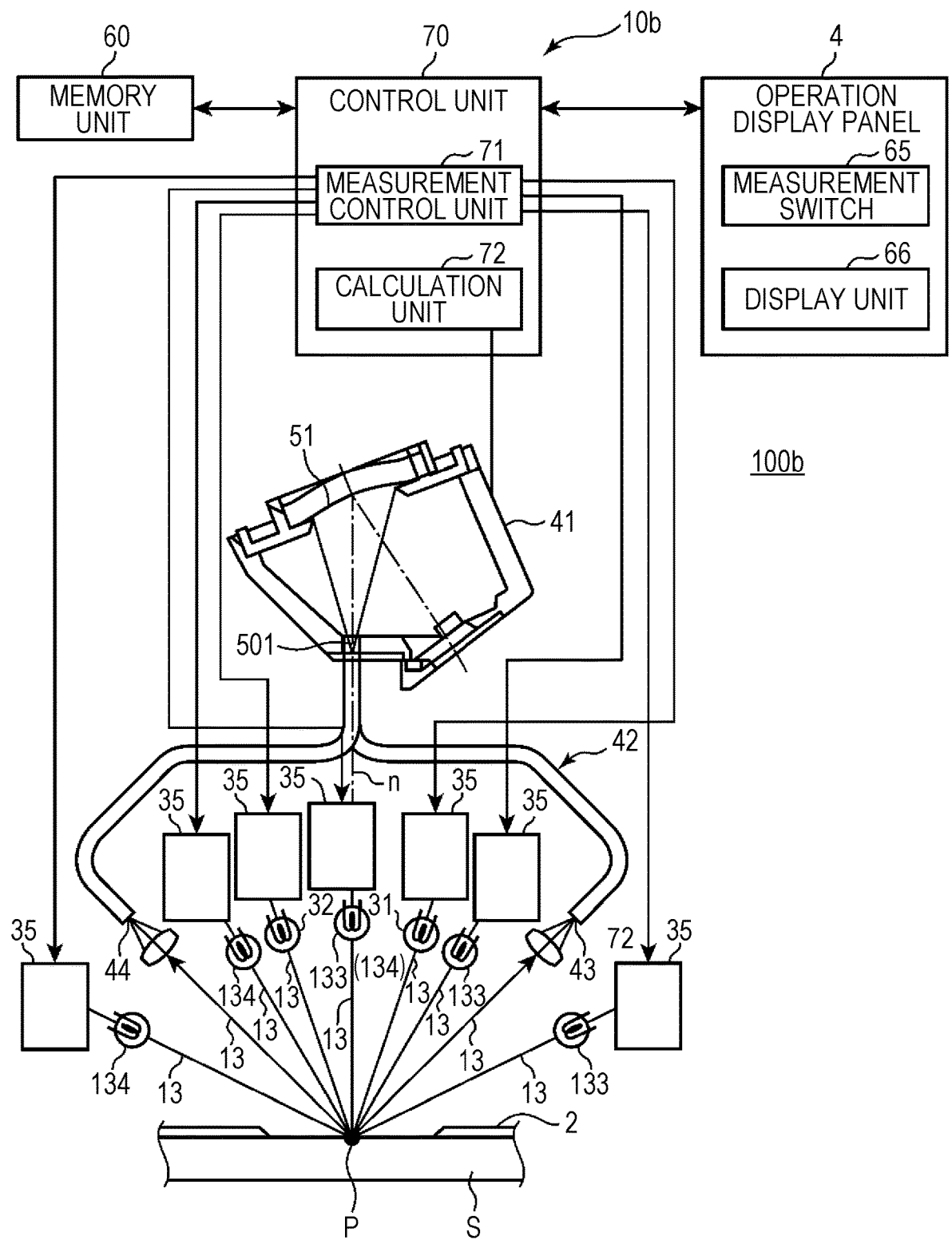
FIG. 11 is a configuration diagram of a colorimeter main body of a colorimeter according to a second embodiment.

FIG. 11 is a configuration diagram of a colorimeter main body of a colorimeter according to a second embodiment. The colorimeter 100b of the second embodiment is a so-called multi-angle colorimeter with an illumination system and, similarly to the colorimeter of the first embodiment, is provided with a colorimeter main body 10b illustrated in FIG. 11 and a casing that houses the colorimeter main body 10b. The casing adopts the same structure as that of the first embodiment.

In addition to the structural requirements of the colorimeter main body of the first embodiment, the colorimeter main body 10b of the second embodiment is further provided with one or a plurality of (three in this embodiment) third illumination units 133 and one or a plurality of (three in this embodiment) fourth illumination units 134.

The third illumination units 133 are constituted by three units that radiate third illumination light 13 toward the intersection point P at respective different incident angles from the first incident angle of a first illumination unit 31.

The fourth illumination units 134 are constituted by three units that are disposed symmetrically with the three third illumination units 133 with the reference line n as a line of symmetry in a plane including the first disposing position of the first illumination unit 31, the reference line n, and the second disposing position of a second illumination unit 32, and radiate fourth illumination light 14 toward the intersection point P at incident angles having a magnitude equal to the magnitude of the incident angles of the three respective third illumination units 133. Except for the above-described configuration, the second embodiment adopts the same configuration as that of the first embodiment.

In the second embodiment, the respective illumination units 31, 32, 133, and 134 are sequentially caused to emit light, and reflected light at the measurement surface by the sequentially emitted light is received by a first light-receiving part 43 and a second light-receiving part 44, such that the reflected light is directed to a light detection unit 41 to be subjected to diffraction spectroscopy; then, on the basis of electrical signals converted by a light detection unit 41, a calculation unit 72 determines each of first and second detection values (spectral reflection characteristics) of light received by the first light-receiving part 43 and the second light-receiving part 44 and, on the basis of the detection values, performs the double-pass correction process to obtain color information (for example, tristimulus values) about the measurement surface present at the measurement point (intersection point P).

Also in the second embodiment, similarly to the first embodiment, a pair of first abutting parts 222 and one second abutting part 223 abut the measurement object S when the measurement object S is measured. Consequently, for example, even when the measurement object has a curved surface, the measurement object can be kept abutted in a fixed posture at all times and lifting off the measurement object can be prevented with the first abutting parts. Furthermore, for example, even in a case where the colorimeter 100b is inclined with respect to the measurement object S when the measurement object S has a curved surface, light is received by the first light-receiving part 43 and the second light-receiving part 44 disposed symmetrically, such that the reflected light is directed to the light detection unit 41 to be subjected to diffraction spectroscopy; then, on the basis of electrical signals converted by the light detection unit 41, the calculation unit 72 determines each of the first and second detection values (spectral reflection characteristics) and, on the basis of the detection values, performs the double-pass correction process to obtain color information (for example, tristimulus values) about the measurement surface present at the measurement point P. Consequently, the posture error can be reduced. Therefore, in the colorimeter 100b of the second embodiment, the possibility of fluctuations in measurement value can be decreased even in a plurality of measurements and more accurate colorimetry is possible.

Next, another embodiment will be described.

Third Embodiment

Figure 12:
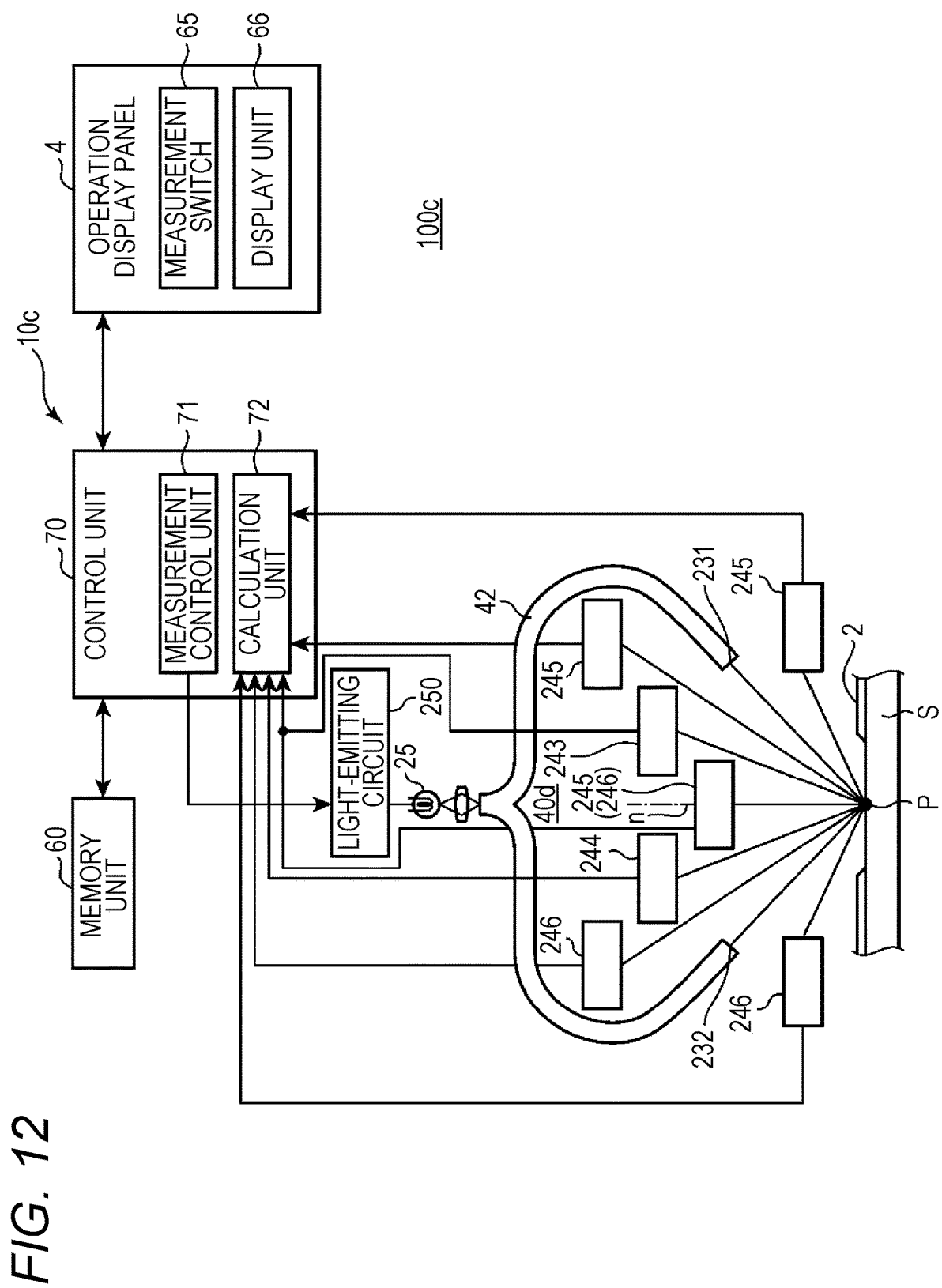
FIG. 12 is a configuration diagram of a colorimeter main body of a colorimeter according to a third embodiment.

FIG. 12 is a configuration diagram of a colorimeter main body of a colorimeter according to a third embodiment. The colorimeter 100c of the third embodiment is a so-called multi-angle colorimeter with a light-receiving system and, similarly to the colorimeter of the first embodiment, is provided with a colorimeter main body 10c illustrated in FIG. 12 and a casing that houses the colorimeter main body 10c. The casing adopts the same structure as that of the first embodiment.

The colorimeter main body 10c of the third embodiment adopts a configuration in which the light-receiving parts and the illumination units are disposed at positions opposite to those of the second embodiment. Other constitutions adopt the same structures as those of the colorimeter main body 10b of the second embodiment.

In more detail, the illumination unit of the colorimeter main body 10c of the third embodiment is provided with a first illumination unit 231 and a second illumination unit 232 that are disposed in the above-mentioned plane and disposed symmetrically with each other with respect to the reference line n to radiate illumination light toward the intersection point P.

The first illumination unit 231 and the second illumination unit 232 share a light source 25 and a light-emitting circuit 250. An optical fiber 42 serving as a bundle fiber with two arms on an exit side (lower end side) and one arm on an incidence side (upper end side) is provided. The two branches of the optical fiber 42 separately function as a first light guide part that is supplied with a first portion of light from the light source 25 and guides the first portion toward the measurement point and a second light guide part that is supplied with a second portion of light from the same light source 25 and guides the second portion toward the measurement point.

The light-receiving part of the colorimeter main body 10c of the third embodiment is provided with a first light-receiving part 243 and a second light-receiving part 244 disposed in the above-mentioned plane and disposed symmetrically with each other with respect to the reference line n and additionally, one or a plurality of third light-receiving parts 245 and fourth light-receiving parts 246 disposed in the above-mentioned plane and disposed symmetrically with each other with respect to the reference line n. In this embodiment, three third light-receiving parts 245 and three fourth light-receiving parts 246 are symmetrically disposed. Furthermore, in this embodiment, one of the third light-receiving parts 245 is disposed on the reference line n and is commonly utilized as one of the fourth light-receiving parts 246.

Each of the light-receiving parts 243 to 246 of the third embodiment is provided with a photoelectric conversion element (not illustrated) and the photoelectric conversion elements are disposed symmetrically with respect to the reference line n so as to contain dispositions at 15°, 45° and 110° and dispositions at 25°, 45°, and 75°, which are opposite specular reflection angles of the optical disposition (geometry) recommended by two main standards ASTME 2194 and DIN 6175-2, 2001 in the evaluation method for metallic coating and pearl color coating. Note that the same module is commonly utilized as the photoelectric conversion element of the third light-receiving part 245 and the photoelectric conversion element of the fourth light-receiving part 246.

Each photoelectric conversion element is configured from an X sensor SX, a Y sensor SY, and a Z sensor SZ that make a reflected light ray from the measurement point P of the measurement object S incident on a light receiver RV via a diffuser plate BD and have spectral sensitivities correlated with respective color matching functions $X(\lambda)$, $Y(\lambda)$, and $Z(\lambda)$. The X sensor SX, the Y sensor SY, and the Z sensor SZ separately convert an incident light ray EL (in this example, first light and second light) into electrical signals corresponding to XYZ component values in the XYZ colorimetric system.

In the third embodiment configured as described above, a measurement control unit 71 causes the light source 25 to emit light via the light-emitting circuit 250, thereby, while keeping the second illumination unit 232 closed with a shutter (not illustrated) provided at a distal end side thereof, turning on only the first illumination unit 231 to detect the first light via the photoelectric conversion elements of respective light-receiving parts, and acquiring a first light detection value using the calculation unit 72 to store in a memory unit 60.

Next, while keeping the first illumination unit 231 closed with a shutter provided at a distal end side thereof, the measurement control unit 71 turns on only the second illumination unit 232 via the light-emitting circuit 250 to detect the second light via the photoelectric conversion elements of respective light-receiving parts, and acquires a second light detection value using the calculation unit 72 to store in the memory unit 60.

Thereafter, on the basis of the first light detection value and the second light detection value stored in the memory unit 60, the calculation unit 72 computes color information about the measurement surface present at the measurement point P. Furthermore, on the basis of the detection values of the first light and the second light of each pair disposed symmetrically with each other, the calculation unit 72 separately averages the detection values to output as a measurement value at each angle after the correction, such that color information about the measurement surface present at the measurement point P is obtained.

Also in the third embodiment, similarly to the first and second embodiments, a pair of first abutting parts 222 and one second abutting part 223 abut the measurement object S when the measurement object S is measured. Consequently, for example, even when the measurement object S has a curved surface, the measurement object S can be kept abutted in a fixed posture at all times and lifting off the measurement object can be prevented with the first abutting parts 222. Furthermore, as in the first and second embodiments, even when the colorimeter 100c is tilted with respect to the measurement object S, this posture error can be reduced by the double-pass correction process in which the light-receiving parts 243, 244, 245, and 246 independently acquire reflected light information at the symmetrical optical disposition and averaging is performed. Therefore, in the colorimeter 100c of the third embodiment, the possibility of fluctuations in measurement value can be decreased even in a plurality of measurements and more accurate colorimetry is possible.

Next, another embodiment will be described.

Fourth Embodiment

Figure 13:
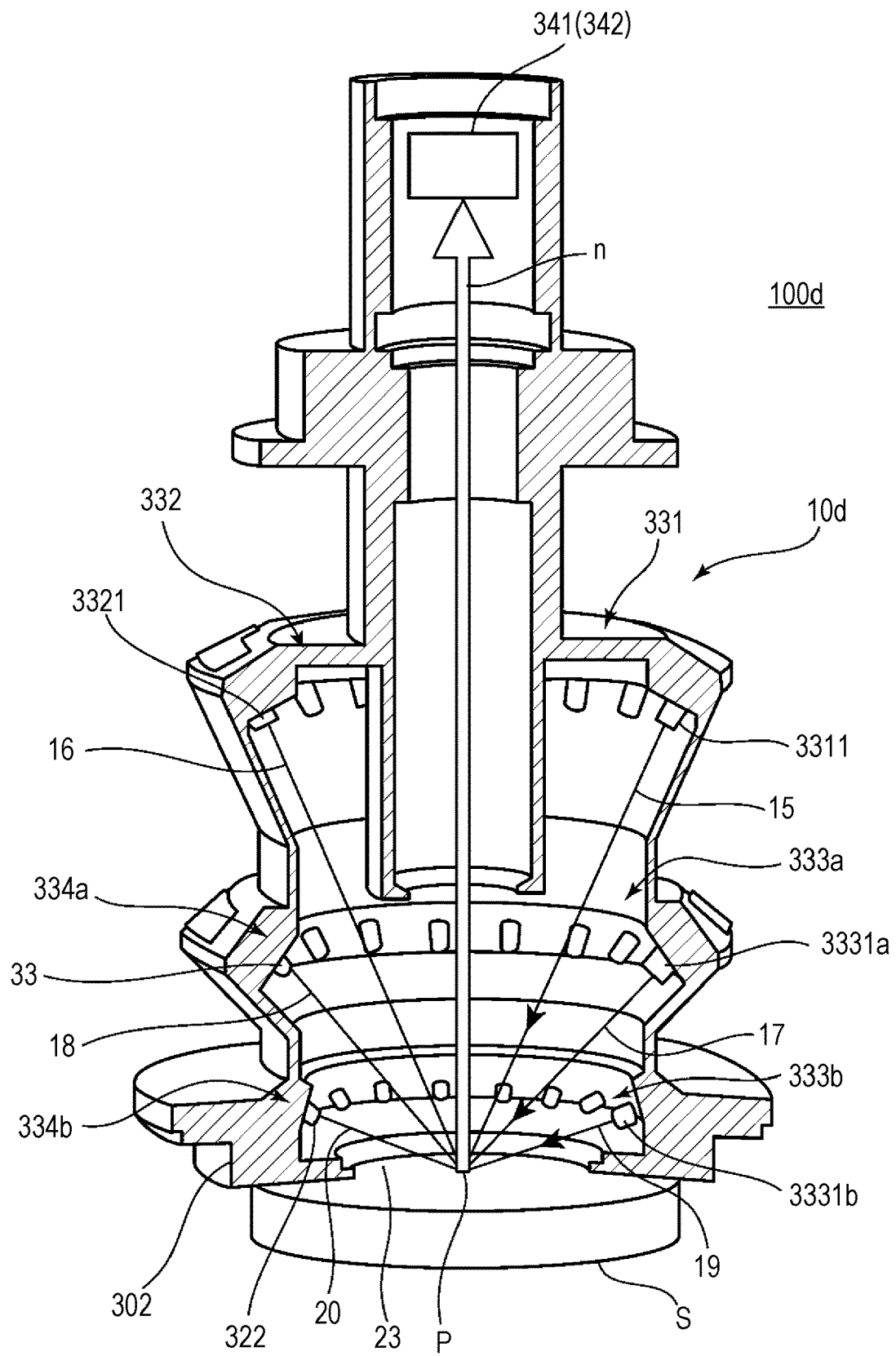
FIG. 13 is a cross-sectional view of a colorimeter according to a fourth embodiment.
Figure 14:
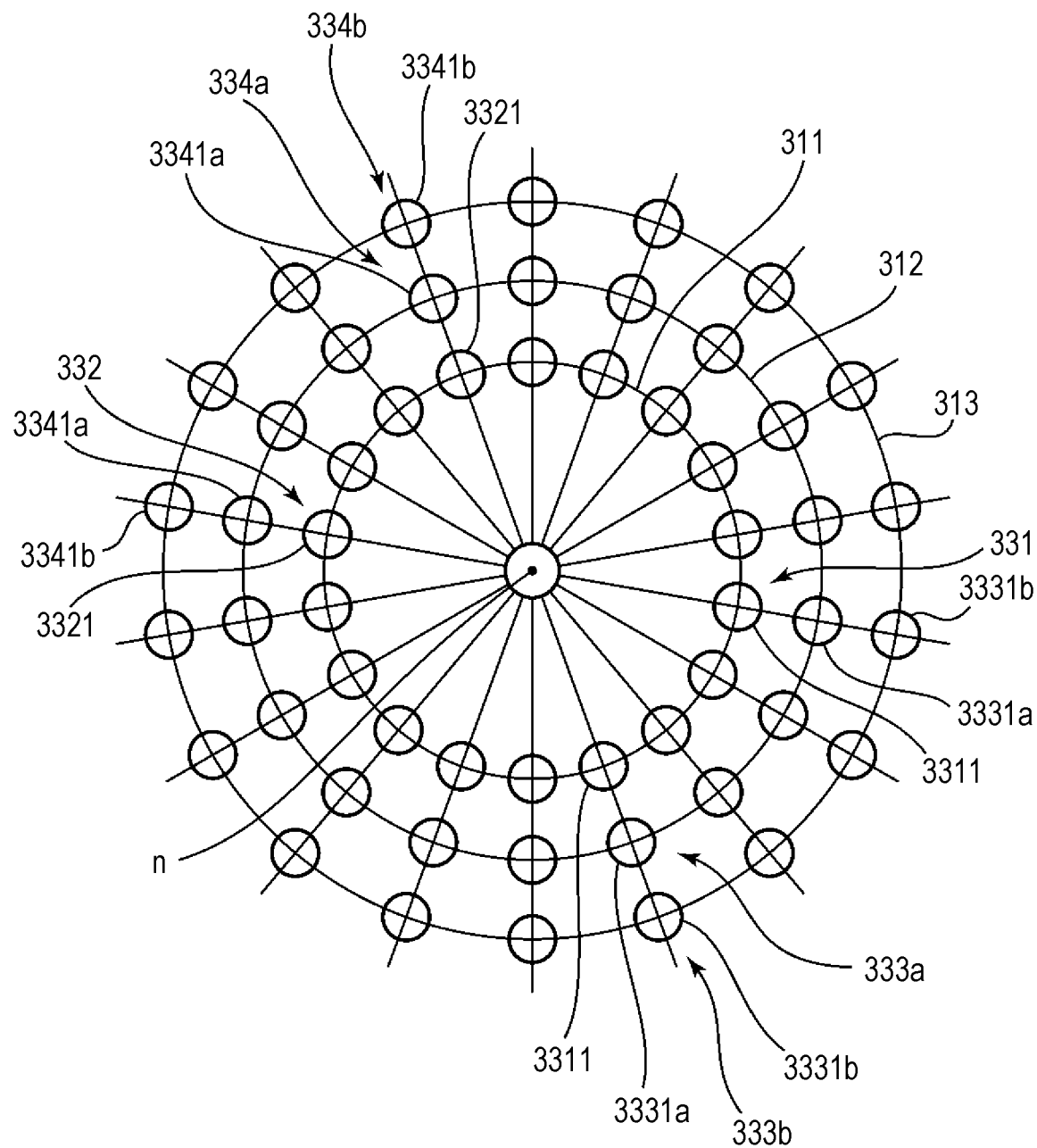
FIG. 14 is an explanatory view of a state in which an illumination unit in the colorimeter of the fourth embodiment is viewed from above.

FIG. 13 is a cross-sectional view of a colorimeter according to a fourth embodiment. FIG. 14 is an explanatory view of a state in which an illumination unit in the colorimeter of the fourth embodiment is viewed from above. The colorimeter 100d of the fourth embodiment is a colorimeter having a geometry of $an°:0°$ and using ring illumination and, as illustrated in FIG. 13, is provided with a colorimeter main body 10d and a casing 302 that houses the colorimeter main body 10d.

The casing 302 in the fourth embodiment is constituted by a cylindrically shaped body and is provided with a measurement opening 23, a pair of first abutting parts, and a pair of second abutting parts on a bottom wall 322 of the casing 302. These measurement opening 23, pair of first abutting parts, and pair of second abutting parts adopt the same structures as those of the first embodiment illustrated in FIGS. 4 and 5.

The colorimeter main body 10d of the fourth embodiment is provided with a first illumination unit 331, a second illumination unit 332, third illumination units 333a and 333b, fourth illumination units 334a and 334b, a first light-receiving part 341, and a second light-receiving part 342.

In this embodiment, the first illumination unit 331 is provided with a plurality of first sub-illumination units 3311 that radiate first illumination light 15 toward the intersection point P at a first incident angle with respect to the reference line n. As illustrated in FIG. 14, these first sub-illumination units 3311 are disposed so as to be spaced apart from each other at equal intervals in a circumferential direction on a first circumference 311.

The second illumination unit 332 is provided with a plurality of second sub-illumination units 3321 that are disposed diametrically opposite to respective first sub-disposing positions of the plurality of first sub-illumination units 3311 with respect to the reference line n and symmetrically with the plurality of respective first sub-illumination units 3311 with the reference line n as a line of symmetry, and separately radiate second illumination light toward the intersection point P. As illustrated in FIG. 14, this plurality of second sub-illumination units 3321 is also disposed so as to be spaced apart from each other at equal intervals in the circumferential direction on the first circumference 311.

Note that, although the first illumination unit 331 and the second illumination unit 332 are disposed in such a manner that adjacent sub-illumination units are spaced apart from each other in the circumferential direction, the sub-illumination units are not restricted to this form but may be disposed continuously in the circumferential direction. Furthermore, those disposed so as to be spaced apart from each other and those continuously disposed may be mixed.

In this embodiment, the third illumination units 333a and 333b are provided with two units of a thirty-first illumination unit 333a and a thirty-second illumination unit 333b.

The thirty-first illumination unit 333a is provided with a plurality of thirty-first sub-illumination units 3331a that are disposed in each plane including each of the first sub-disposing positions of the plurality of first sub-illumination units 3311, the reference line n, and each of second sub-disposing positions of the plurality of second sub-illumination units 3321, and radiate thirty-first illumination light 17 toward the intersection point P at a *3a-th* incident angle different from the first incident angle with respect to the reference line n. These thirty-first sub-illumination units 3331a are disposed at positions that are closer to the side of the measurement object S than the first illumination unit 331 at the time of measurement and also at equal intervals in the circumferential direction on a second circumference 312 illustrated in FIG. 14. The second circumference 312 has a larger diameter than that of the first circumference 311. Therefore, the *3a-th* incident angle has a larger magnitude than that of the first incident angle with respect to the reference line n.

The thirty-second illumination unit 333b is provided with a plurality of thirty-second sub-illumination units 3331b that are disposed in each plane described above, which includes each of the first sub-disposing positions of the plurality of first sub-illumination units 3311, the reference line n, and each of the second sub-disposing positions of the plurality of second sub-illumination units 3321, and radiate thirty-second illumination light 19 toward the intersection point P at a *3b-th* incident angle different from the first incident angle with respect to the reference line n. These thirty-second sub-illumination units 3331b are disposed at positions that are closer to the side of the measurement object S than the thirty-first sub-illumination units 333a at the time of measurement and also at equal intervals in the circumferential direction on a third circumference 313 illustrated in FIG. 14. The third circumference 313 has a larger diameter than that of the second circumference 312. Therefore, the *3b-th* incident angle has a larger magnitude than that of the *3a-th* incident angle with respect to the reference line n.

In this embodiment, the fourth illumination units 334a and 334b are provided with two units of a forty-first illumination unit 334a and a forty-second illumination unit 334b in correspondence to the thirty-first illumination unit 333a and the thirty-second illumination unit 333b.

The forty-first illumination unit 334a is provided with a plurality of forty-first sub-illumination units 3341a that are disposed symmetrically with the plurality of respective thirty-first sub-illumination units 3331a in each plane described above with the reference line n as a line of symmetry, and separately radiate forty-first illumination light toward the intersection point P. As illustrated in FIG. 14, this plurality of forty-first sub-illumination units 3341a is also disposed so as to be spaced apart from each other at equal intervals in the circumferential direction on the second circumference 312. The forty-second illumination unit 334b is provided with a plurality of forty-second sub-illumination units 3341b that are disposed symmetrically with the plurality of respective thirty-second sub-illumination units 3331b in each plane described above with the reference line n as a line of symmetry, and separately radiate forty-second illumination light toward the intersection point P. As illustrated in FIG. 14, this plurality of forty-second sub-illumination units 3341b is also disposed so as to be spaced apart from each other at equal intervals in the circumferential direction on the third circumference 313.

Note that, although the thirty-first sub-illumination units 3331a and the forty-first sub-illumination units 3341a are disposed such that adjacent ones are spaced apart from each other in the circumferential direction, the sub-illumination units are not restricted to this form but may be disposed continuously in the circumferential direction. The thirty-second sub-illumination units 3331b and the forty-second sub-illumination units 3341b are also each disposed such that adjacent ones are spaced apart from each other in the circumferential direction, but the sub-illumination units may be disposed continuously in the circumferential direction. Furthermore, in these cases, those disposed so as to be spaced apart from each other and those continuously disposed may be mixed.

Then, in the present embodiment, the first light-receiving part 341 is commonly utilized as the second light-receiving part 342 and is provided with a photoelectric conversion element. The first light-receiving part 341 is disposed on the reference line n.

In the fourth embodiment configured as described above, similarly to the third embodiment, the first illumination unit 331 to the fourth illumination unit 334 are sequentially turned on and light is detected via the photoelectric conversion element of the first light-receiving part 341 (that is, the second light-receiving part 342); then, the calculation unit acquires light detection values and computes color information about the measurement surface present at the measurement point P on the basis of the light detection values. Furthermore, on the basis of the detection values of the first light and the second light of each pair, the calculation unit separately averages the detection values to output as a measurement value at each angle after the correction, such that color information about the measurement surface present at the measurement point P (intersection point P) is obtained.

Also in the fourth embodiment, similarly to the first to third embodiments, a pair of first abutting parts 222 and one second abutting part 223 abut the measurement object S when the measurement object S is measured. Consequently, for example, even when the measurement object S has a curved surface, the measurement object S can be kept abutted in a fixed posture at all times and lifting off the measurement object S can be prevented with the first abutting parts 222. Furthermore, as in the first to third embodiments, even when the colorimeter 100d is tilted with respect to the measurement object S, this posture error can be reduced by the double-pass correction process in which the illumination units 331, 332, 333 (333a and 333b), 334 (334a and 334b) independently acquire reflected light information at the symmetrical optical disposition and averaging is performed. Therefore, in the colorimeter 100d of the fourth embodiment, the possibility of fluctuations in measurement value can be decreased even in a plurality of measurements and more accurate colorimetry is possible.

Next, another embodiment will be described.

Fifth Embodiment

Figure 15:
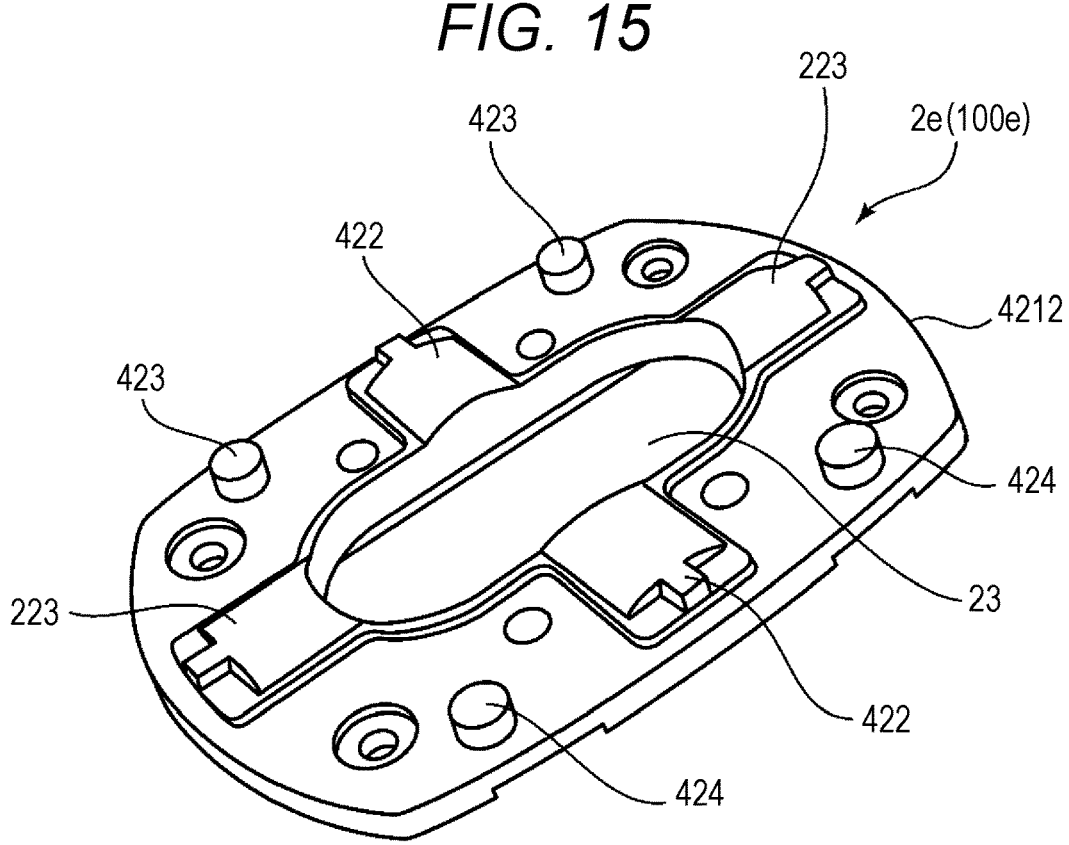
FIG. 15 is a perspective view of a mounting wall part included in a colorimeter according to a fifth embodiment.
Figure 16:
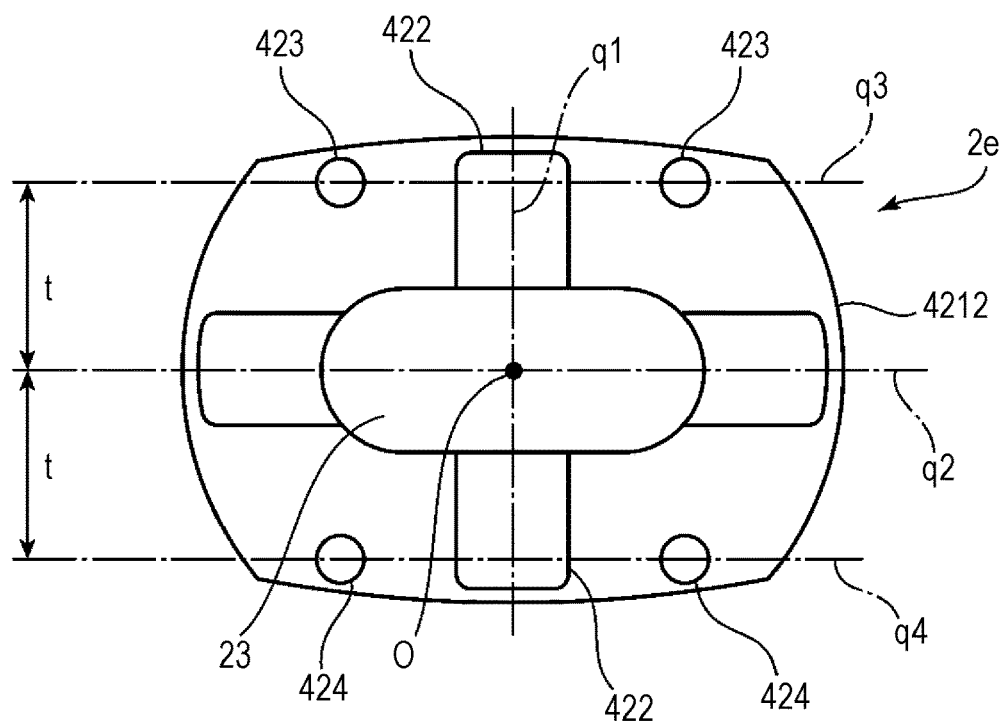
FIG. 16 is a bottom view of the mounting wall part in FIG. 15.
Figure 17:
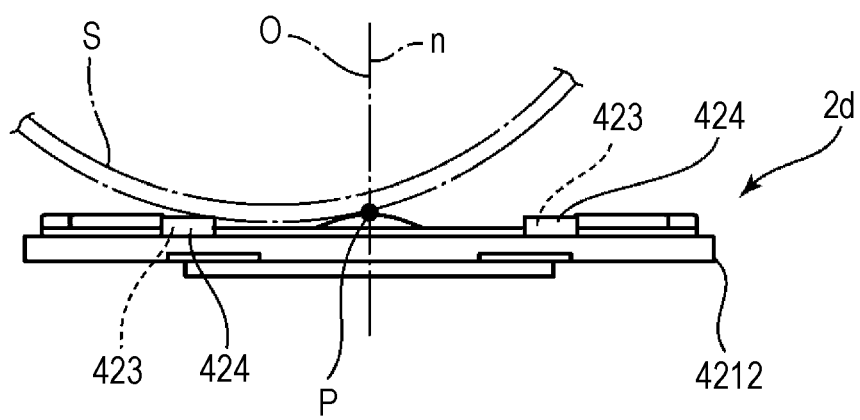
FIG. 17 is a side view of the mounting wall part in FIG. 15.

FIG. 15 is a perspective view of a mounting wall part included in a colorimeter according to a fifth embodiment. FIG. 16 is a bottom view of the mounting wall part in FIG. 15. FIG. 17 is a side view of the mounting wall part in FIG. 15. Similarly to the colorimeter of the first embodiment, the colorimeter 100e of the fifth embodiment is provided with a colorimeter main body and a casing 2e that houses the colorimeter main body. The colorimeter main body of the colorimeter 100e of the fifth embodiment adopts the same structure as that of the colorimeter main body of the first embodiment. Note that the colorimeter main body of the colorimeter 100e of the fifth embodiment may adopt the same structure as that of the colorimeter main body of any one of the second to fourth embodiments.

The abutting part of the casing 2e of the fifth embodiment are provided with a pair of first abutting parts 422 formed on a peripheral edge portion of a measurement opening 23 in a mounting wall part 4212 of an opposing wall, and a pair of third abutting parts 423 and a pair of fourth abutting parts 424 formed on the mounting wall part 4212 of an opposing wall main body so as to protrude toward the side of the measurement object S to be opposed at the time of measurement.

The first abutting parts 422 adopts the same structure as that of the first embodiment and are formed on two sides of the measurement opening 23 in the width direction orthogonal to the longitudinal direction so as to flank the center axis O of the measurement opening 23.

The third abutting parts 423 are each configured from a columnar protruding piece, and are disposed on a first orthogonal line q3 parallel to a center orthogonal line q2 with a distance t interposed therebetween, on two sides of a first-abutting-part connection line q1 that connects the pair of first abutting parts 422 to each other so as to flank the first-abutting-part connection line q1, where the center orthogonal line q2 passes through the middle point (the center axis O of the measurement opening 23) of the first-abutting-part connection line q1 and is orthogonal to the first-abutting-part connection line q1.

The fourth abutting parts 424 are disposed at positions symmetrical with the pair of respective third abutting parts 423 with respect to the center orthogonal line q2. In more detail, the fourth abutting parts 424 are disposed on a second orthogonal line q4 on two sides of the first-abutting-part connection line q1 so as to flank the first-abutting-part connection line q1, where the second orthogonal line q4 is provided on an opposite side of the first orthogonal line q3 so as to flank the center orthogonal line q2 and parallel to the center orthogonal line q2 with the distance t interposed therebetween.

In the fifth embodiment configured as described above, as illustrated in FIG. 17, the measurement object S is abutted in a fixed posture with the pair of first abutting parts 422, one third abutting part 423, and one fourth abutting part 424. Therefore, the measurement object S is abutted at four points, that is, the pair of first abutting parts 422, one third abutting part 423 and one fourth abutting part 424. Consequently, for example, even when the measurement object S has a curved surface, lifting off the measurement object S can be prevented with the first abutting parts 422 and additionally, the measurement object S can be more surely kept abutted in a stable posture. Furthermore, for example, even in a case where the colorimeter 100e is inclined with respect to the measurement object S when the measurement object S has a curved surface, more accurate colorimetry is possible by the so-called double-pass correction in which colorimetry and averaging are performed on the basis of reflected light information obtained with the symmetrical optical disposition. Therefore, in the colorimeter 100e of the fifth embodiment, the possibility of fluctuations in measurement value can be decreased even in a plurality of measurements and more accurate colorimetry is possible.

Note that, in the fifth embodiment, although the opposing wall of the casing 2e is provided with the pair of third abutting parts 423 and the pair of fourth abutting parts 424 in place of the pair of second abutting parts 223, the abutting parts are not restricted to this form but, for example, the pair of second abutting parts 223 (having the same structure as that of the first embodiment) may be provided together with the pair of third abutting parts 423 and the pair of fourth abutting parts 424; the form can be changed appropriately. In addition, when the pair of second abutting parts 223 is provided, the pair of third abutting parts 423 and the pair of fourth abutting parts 424 are disposed closer to the pair of first abutting parts 222 than the pair of second abutting parts 223. The above is a description of the embodiment.

Figure 18A:
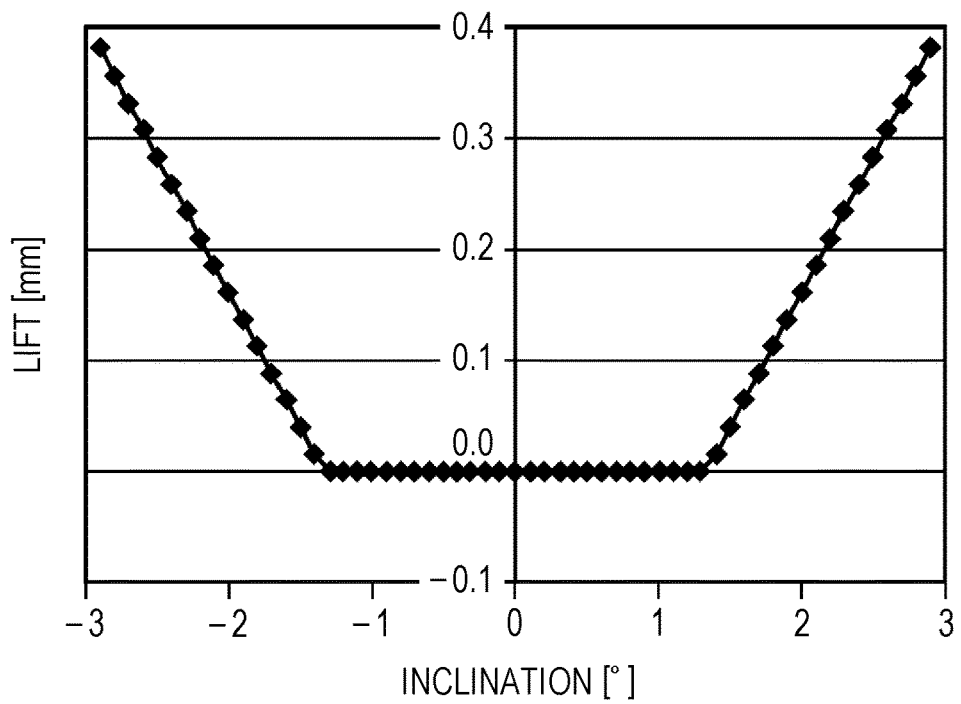
FIG. 18A is a graph representing a relationship between the lifted amount and the inclination of the colorimeter of the first embodiment with respect to the measurement object.
Figure 18B:
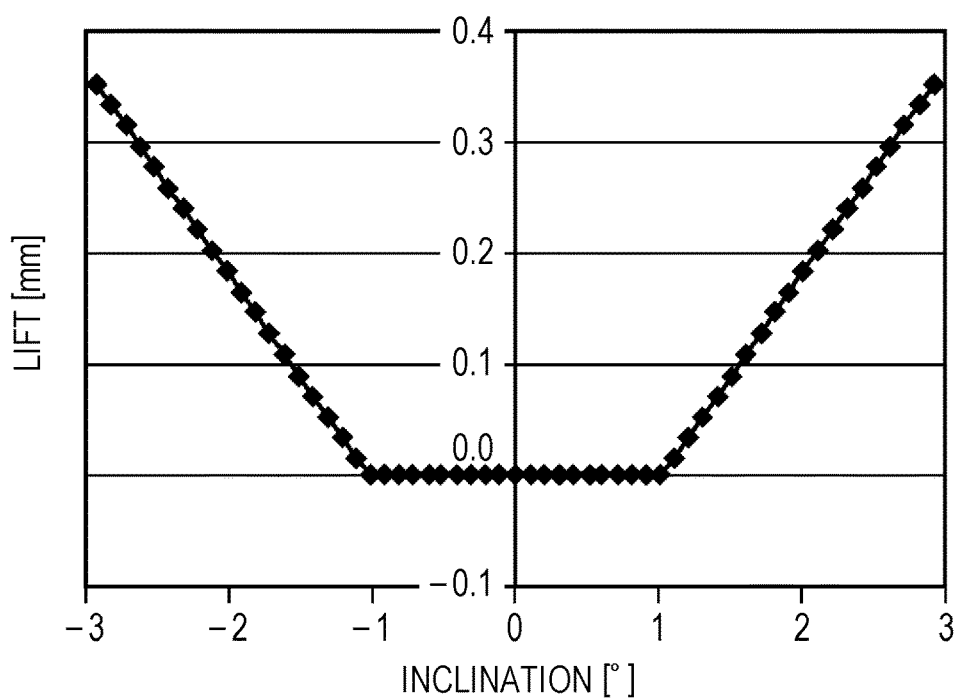
FIG. 18B is a graph representing a relationship between the lifted amount and the inclination of the colorimeter of the fifth embodiment.

Next, when the colorimeter 100e of the fifth embodiment illustrated in FIG. 15 provided with the casing 2e having the pair of third abutting parts 423 and the pair of fourth abutting parts 424, and the colorimeter 100a of the first embodiment illustrated in FIG. 4 provided with the casing 2a not having the third abutting parts 423 and the fourth abutting parts 424 are used, a relationship between the lifted amount and the inclination at the position of the center axis O of the measurement opening 23 in the opposing wall with respect to a curved measurement object was examined and results thereof are illustrated in FIGS. 18A and 18B. FIG. 18A is a graph representing a relationship between the aforementioned lifted amount and inclination of the colorimeter 100a of the first embodiment, and FIG. 18B is a graph representing a relationship between the aforementioned lifted amount and inclination of the colorimeter 100e of the fifth embodiment. The horizontal axes in FIGS. 18A and 18B each denote inclinations expressed in units of [°], and the vertical axes therein each denote lifts expressed in units of [mm]. As illustrated in FIGS. 18A and 18B, there is no great difference in inclination areas where lifts are 0 mm and, from this result, it is considered that equivalent levels are implemented in terms of performance.

Figure 19:
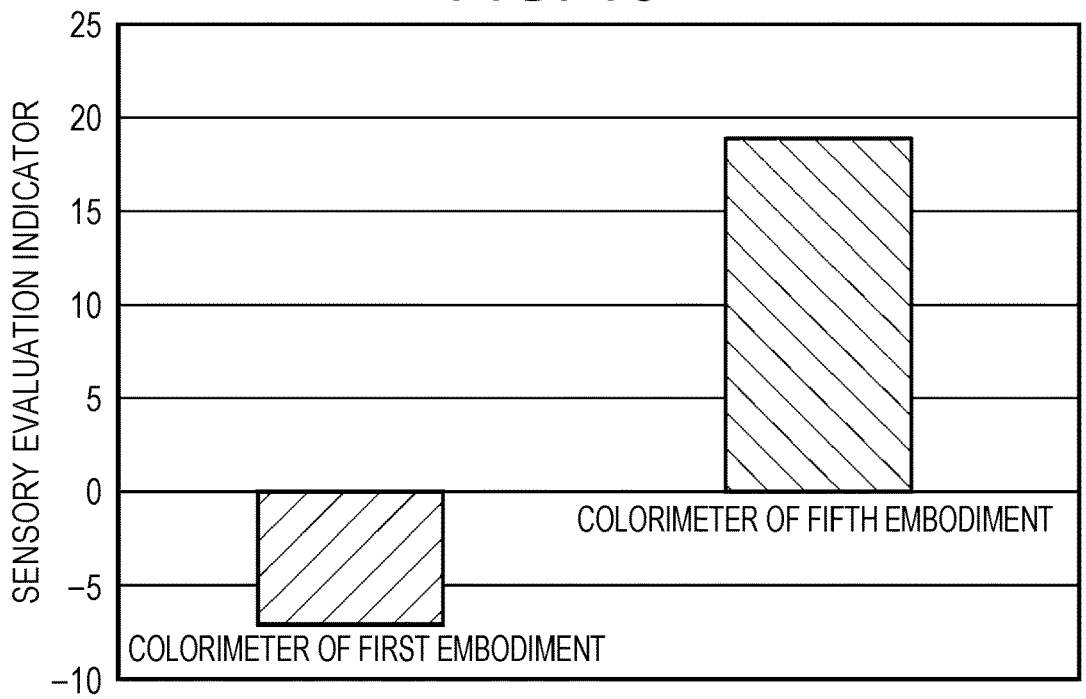
FIG. 19 is a graph representing sensory evaluation of the colorimeter of the first embodiment and the colorimeter of the fifth embodiment.

Furthermore, the colorimeter 100e of the fifth embodiment and the colorimeter 100a of the first embodiment each performed colorimetry of the measurement object S and sensory evaluation of the measurers at the time of colorimetry was conducted. The results thereof are illustrated in FIG. 19. FIG. 19 is a graph representing sensory evaluation of the colorimeter of the first embodiment and the colorimeter of the fifth embodiment. The vertical axis in FIG. 19 denotes a sensory evaluation indicator.

This sensory evaluation presents the results obtained in such a manner that twelve measurers performed colorimetry of the measurement objects (including curved objects and planar objects) S, the feeling of use of each measurer for the colorimeter is quantified, and these values are totaled. In the quantification, a case where a positive impression is given to the colorimeter (easy to use or the like in comparison between the colorimeter 100e of the fifth embodiment and the colorimeter 100a of the first embodiment) is quantified into "+1", a case where a neutral impression is given is quantified into "0", and a negative impression (difficult to use or the like in comparison between the colorimeter 100e of the fifth embodiment and the colorimeter 100a of the first embodiment) is quantified into "−1"; the total value thereof is employed as the sensory evaluation indicator.

As a result, in the colorimeter 100e of the fifth embodiment, the sensory evaluation indicator is higher than that of the colorimeter 100a of the first embodiment, and the result that the sensory evaluation indicator becomes higher by increasing the number of abutting parts was obtained. It is considered that, in the colorimeter 100e of the fifth embodiment, it is easy to psychologically feel that the colorimeter 100e and the measurement object S are in contact with each other, and the user can perceive a sense of security beforehand to start the measurement.

(Comparison)

Next, a comparative test between the colorimeter 100 of the present embodiments and a colorimeter of a comparative example was carried out. The comparative test was carried out as follows.

Figure 21:
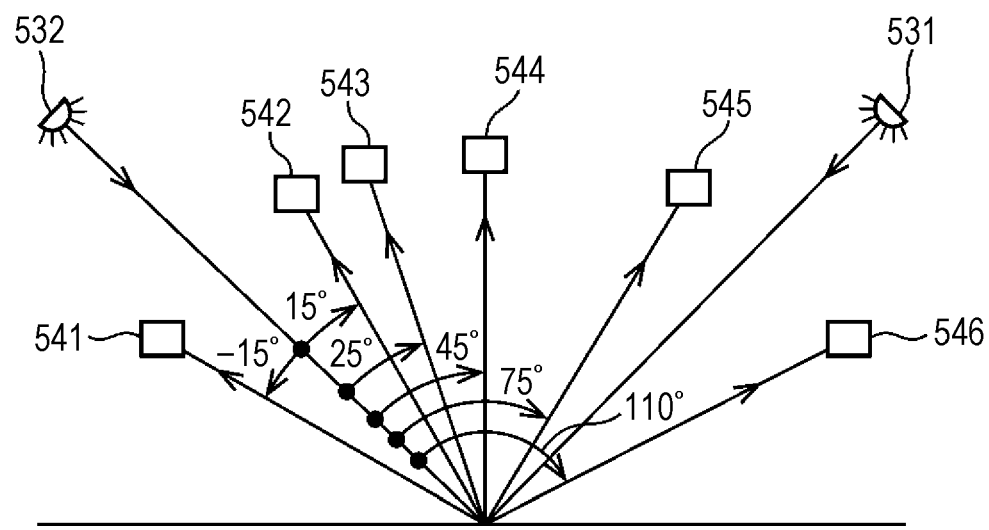
FIG. 21 is an explanatory diagram of the disposing positions of respective light-receiving parts with respect to illumination units of the colorimeter used for the comparative measurement.
Figure 22:
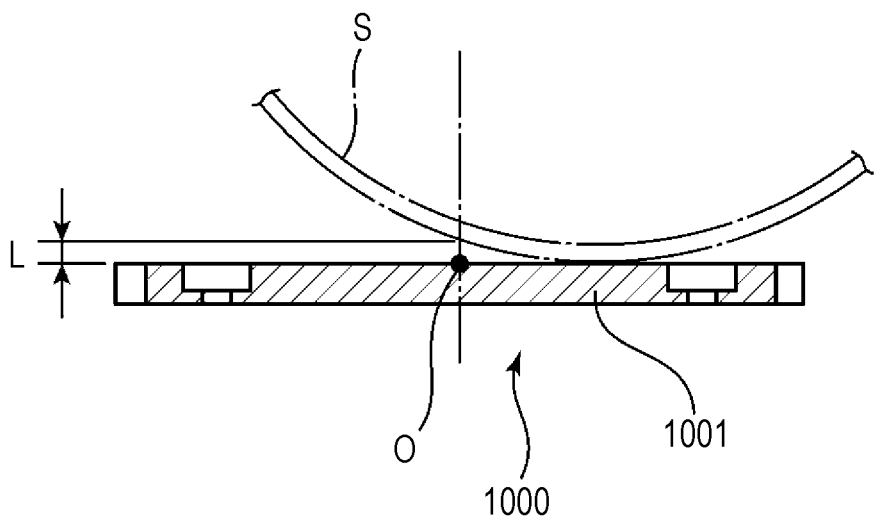
FIG. 22 is an explanatory diagram of a conventional example.

In this comparative test, a so-called multi-angle colorimeter with the light-receiving system was used as the colorimeter 100 of the present embodiments. More specifically, as illustrated in FIG. 21, the colorimeter main body of the colorimeter 100 used in the above comparative test is provided with a first illumination unit 531 and a second illumination unit 532, and is provided with light-receiving parts 541 to 546 disposed at respective positions forming −15°, +15°, +25°, +45°, +75°, and +110° with respect to the specularly reflected light of the first illumination unit 531. Furthermore, although illustration is omitted, in order to carry out the double-pass correction described above, the colorimeter main body of the colorimeter 100 used in the comparative test is provided with respective light-receiving parts disposed at positions symmetrical with these light-receiving parts 541 to 546. Additionally, the colorimeter 100 that is provided with such a colorimeter main body and used in the comparative test has a pair of first abutting parts 422 and a pair of second abutting parts 423.

The colorimeter of the comparative example has a colorimeter main body of the same structure as that of the above-described colorimeter main body of the colorimeter 100 of the present embodiments, but a casing thereof is in a planar shape having no abutting part.

Figure 20:
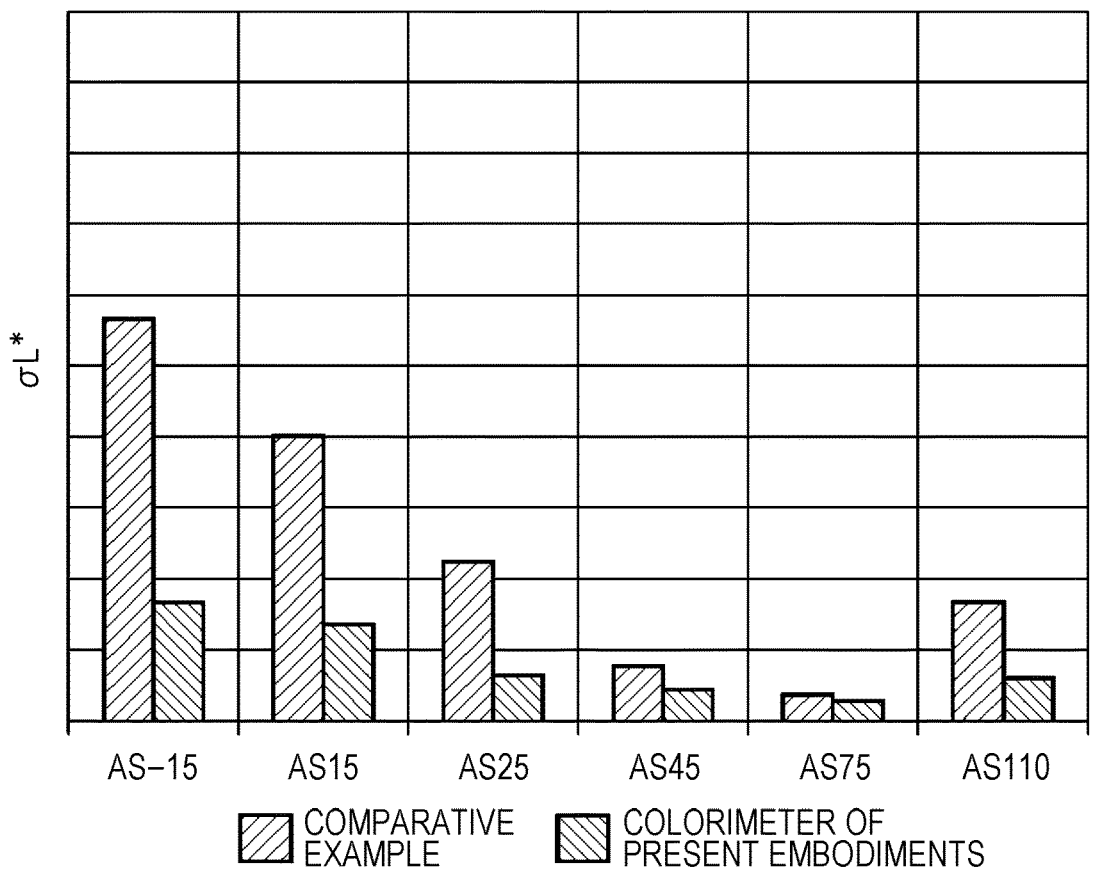
FIG. 20 is a graph representing results of a comparative test between the colorimeter of the embodiments and a comparative example thereof.

The measurement object S has a curved surface shape (R300). Then, each of the twelve measurers carried out colorimetry ten times using each of the colorimeter 100 of the present embodiments and the colorimeter of the comparative example, and the average value of L* of the L*a*b* colorimetric system was determined in each colorimetry result after the double-pass correction; then a standard deviation σL* thereof was computed. The results thereof are illustrated in FIG. 20. FIG. 20 is a graph representing results of the comparative test between the colorimeter of the embodiments and the comparative example thereof. The horizontal axis in FIG. 20 indicates the observation angle and the vertical axis therein indicates the standard deviation σL*. That is, in FIG. 20, AS-15, AS15, AS25, AS45, AS75, and AS110 indicate standard deviations σL* of the measurement results at −15°, +15°, +25°, +45°, +75° and +110°, respectively. The bar graphs hatched with the right-downward slanting lines are the results of the colorimeter 100 of the present embodiments, whereas the bar graphs hatched with the left-downward slanting lines are the results of the colorimeter of the comparative example.

As illustrated in FIG. 20, fluctuations in colorimetry results of the colorimeter 100 of the present embodiments are smaller than those of the colorimeter of the comparative example. Therefore, the colorimeter 100 of the present embodiments having the first abutting parts 422 and the second abutting parts 423 can perform more accurate colorimetry than the planar colorimeter of the comparative example having no abutting part.

Although the present specification discloses the technologies of various aspects as described thus far, the main technologies thereamong are summarized below.

A colorimeter according to one aspect is a colorimeter that performs colorimetry of a measurement object, the colorimeter including: a first illumination unit that radiates first illumination light toward an intersection point between an opening plane of a measurement opening and a prescribed reference line intersecting with the opening plane, at a prescribed first incident angle with respect to the reference line; a second illumination unit that is disposed diametrically opposite to a first disposing position of the first illumination unit with respect to the reference line and symmetrically with the first illumination unit with the reference line as a line of symmetry, and radiates second illumination light toward the intersection point; a first light-receiving part that is disposed in a plane including the first disposing position of the first illumination unit, the reference line, and a second disposing position of the second illumination unit, and receives light from the intersection point by facing the intersection point at a prescribed first observation angle with respect to the reference line; a second light-receiving part that is disposed symmetrically with the first light-receiving part in the plane with the reference line as a line of symmetry, and receives light from the intersection point; a calculation unit that determines color information about the measurement object at the intersection point on the basis of a first measurement value of the first light-receiving part and a second measurement value of the second light-receiving part; and an opposing wall that opposes the measurement object when the measurement object is to be measured, in which the opposing wall includes: an opposing wall main body in which the measurement opening is formed; and an abutting part that is formed in an opposing wall main body so as to protrude from the opposing wall main body toward a side of the measurement object to be opposed and abuts the measurement object when the measurement object is measured, and the abutting part includes: a pair of first abutting parts disposed on two sides of the measurement opening so as to flank the measurement opening; and a pair of second abutting parts disposed on an orthogonal line that is orthogonal to a first-abutting-part connection line that connects the pair of first abutting parts to each other, the pair of second abutting parts being disposed on two sides of the first-abutting-part connection line so as to flank the first-abutting-part connection line.

According to this aspect, when the measurement object is measured, the pair of first abutting parts and the second abutting part abut the measurement object. Consequently, for example, even when the measurement object has a curved surface, the measurement object can be kept abutted in a fixed posture at all times and lifting off the measurement object can be prevented with the first abutting parts. Furthermore, for example, even in a case where the colorimeter is inclined with respect to the measurement object when the measurement object has a curved surface, more accurate colorimetry is possible by the so-called double-pass correction in which colorimetry and averaging are performed on the basis of reflected light information obtained with the symmetrical optical disposition. Therefore, in the colorimeter of the present invention, the possibility of fluctuations in measurement value can be decreased even in a plurality of measurements and more accurate colorimetry is possible.

A colorimeter according to another aspect is a colorimeter that performs colorimetry of a measurement object, the colorimeter including: a first illumination unit that radiates first illumination light toward an intersection point between an opening plane of a measurement opening and a prescribed reference line intersecting with the opening plane, at a prescribed first incident angle with respect to the reference line; a second illumination unit that is disposed diametrically opposite to a first disposing position of the first illumination unit with respect to the reference line and symmetrically with the first illumination unit with the reference line as a line of symmetry, and radiates second illumination light toward the intersection point; a first light-receiving part that is disposed in a plane including the first disposing position of the first illumination unit, the reference line, and a second disposing position of the second illumination unit, and receives light from the intersection point by facing the intersection point at a prescribed first observation angle with respect to the reference line; a second light-receiving part that is disposed symmetrically with the first light-receiving part in the plane with the reference line as a line of symmetry, and receives light from the intersection point; a calculation unit that determines color information about the measurement object at the intersection point on the basis of a first measurement value of the first light-receiving part and a second measurement value of the second light-receiving part; and an opposing wall that opposes the measurement object when the measurement object is to be measured, in which the opposing wall includes: an opposing wall main body in which the measurement opening is formed; and an abutting part that is formed in an opposing wall main body so as to protrude from the opposing wall main body toward a side of the measurement object to be opposed and abuts the measurement object when the measurement object is measured, and the abutting part includes: a pair of first abutting parts disposed on two sides of the measurement opening so as to flank the measurement opening; a pair of third abutting parts disposed on an orthogonal line parallel to a center orthogonal line with a distance interposed therebetween, on two sides of a first-abutting-part connection line that connects the pair of first abutting parts to each other so as to flank the first-abutting-part connection line, the center orthogonal line passing through a middle point of the first-abutting-part connection line and is orthogonal to the first-abutting-part connection line; and a pair of fourth abutting parts disposed symmetrically with the pair of third abutting parts with respect to the center orthogonal line.

According to this aspect, when the measurement object is measured, four points, that is, the pair of first abutting parts, one third abutting part, and one fourth abutting part abut the measurement object. Consequently, for example, even when the measurement object has a curved surface, lifting off the measurement object can be prevented with the first abutting parts and additionally, the measurement object can be more surely kept abutted in a stable posture. Furthermore, for example, even in a case where the colorimeter is inclined with respect to the measurement object when the measurement object has a curved surface, more accurate colorimetry is possible by the so-called double-pass correction in which colorimetry and averaging are performed on the basis of reflected light information obtained with the symmetrical optical disposition. Therefore, in the above-described colorimeter, the possibility of fluctuations in measurement value can be decreased even in a plurality of measurements and accurate colorimetry is possible.

In another aspect, in the above-described colorimeters, the second light-receiving part is commonly utilized as the first light-receiving part.

According to this aspect, since the second light-receiving part is commonly utilized as the first light-receiving part, manufacturing at low cost is implemented. Furthermore, according to this aspect, it is possible to provide a colorimeter that achieves the above-described actions and effects, while having a geometry of α°:0°.

In another aspect, the above-described colorimeters further include: one or a plurality of third illumination units that is disposed in the plane and radiates third illumination light toward the intersection point at a third incident angle different from the first incident angle with respect to the reference line; and one or a plurality of fourth illumination units that is disposed symmetrically with the one or the plurality of third illumination units in the plane with the reference line as a line of symmetry and radiates fourth illumination light toward the intersection point.

According to this aspect, it is possible to provide a so-called multi-angle colorimeter with the illumination system, which achieves the above-described actions and effects.

In another aspect, the above-described colorimeters further include: one or a plurality of third light-receiving parts that is disposed in the plane and receives light from the intersection point by facing the intersection point at a third observation angle different from both of the first observation angle and a second observation angle; and one or a plurality of fourth light-receiving parts that is disposed symmetrically with the one or the plurality of third light-receiving parts in the plane with the reference line as a line of symmetry and receives light from the intersection point by facing the intersection point.

According to this aspect, it is possible to provide a so-called multi-angle colorimeter with the light-receiving system, which achieves the above-described actions and effects.

In another aspect, in the above-described colorimeters, the first illumination unit includes a plurality of first sub-illumination units that separately radiate first illumination light toward the intersection point at the prescribed first incident angle with respect to the prescribed reference line, the second illumination unit includes a plurality of second sub-illumination units that are disposed diametrically opposite to respective first sub-disposing positions of the plurality of first sub-illumination units with respect to the reference line and symmetrically with the plurality of respective first sub-illumination units with the reference line as a line of symmetry, and separately radiate second illumination light toward the intersection point, and the plurality of first sub-illumination units and the plurality of second sub-illumination units are disposed on the same circumference so as to be spaced apart from each other or continuously.

According to this aspect, it is possible to provide a colorimeter with a so-called ring illumination provided with the plurality of first sub-illumination units and the plurality of second sub-illumination units disposed on the same circumference, which achieves the above-described actions and effects.

In another aspect, the above-described colorimeters further include: one or a plurality of third illumination units including third sub-illumination units that are disposed in each plane including each of the first sub-disposing positions of the plurality of first sub-illumination units, the reference line, and each of second sub-disposing positions of the plurality of second sub-illumination units, and separately radiate third illumination light toward the intersection point at an incident angle different from the first incident angle with respect to the reference line; and one or a plurality of fourth illumination units including a plurality of fourth sub-illumination units that are disposed symmetrically with the plurality of respective third sub-illumination units in each plane above with the reference line as a line of symmetry, and separately radiate fourth illumination light toward the intersection point, in which the plurality of third sub-illumination units and the plurality of fourth sub-illumination units are disposed on the same circumference so as to be spaced apart from each other or continuously.

According to this aspect, it is possible to provide the so-called multi-angle colorimeter with the illumination system using a so-called ring illumination provided with the plurality of first sub-illumination units and the plurality of second sub-illumination units disposed on the same circumference, which achieves the above-described actions and effects.

This application is based on Japanese Patent Application No. 2016-139118 filed on Jul. 14, 2016, including the specification, claims, drawings and abstract, the entire disclosure of which is incorporated herein by reference in its entirety.

While the embodiments of the present invention have been illustrated and described in detail, it is to be understood that the exemplary drawings and actual examples are illustrative only and not limiting. The scope of the present invention should be construed according to the language of the appended claims.

Additionally, in order to express the present invention, the description has been properly and sufficiently given through the above-mentioned embodiments with reference to the drawings, but it should be recognized that it is easy for those skilled in the art to vary and/or modify the above-described embodiments. Therefore, as long as variations or modifications that one of ordinary skill in the art will make are of a level that does not depart from the scope of the claims set forth in the claims, it is interpreted that the variations or modifications are included in the scope of the claims.

INDUSTRIAL APPLICABILITY

According to the present invention, it is possible to provide a colorimeter that performs colorimetry of a measurement object.

The invention claimed is:
1. A colorimeter that performs colorimetry of a measurement object, the colorimeter comprising:
a first illumination part that radiates first illumination light toward an intersection point between an opening plane of a measurement opening, wherein the measurement opening has a long-hole shape, and a prescribed reference line intersecting with the opening plane, at a prescribed first incident angle with respect to the reference line;

a second illumination part that is disposed diametrically opposite to a first disposing position of the first illumination part with respect to the reference line and symmetrically with the first illumination part with the reference line as a line of symmetry, and radiates second illumination light toward the intersection point;

a first light-receiving part that is disposed in a plane including the first disposing position of the first illumination part, the reference line, and a second disposing position of the second illumination part, and receives light from the intersection point by facing the intersection point at a prescribed first observation angle with respect to the reference line;

a second light-receiving part that is disposed symmetrically with the first light-receiving part in the plane with the reference line as a line of symmetry, and receives light from the intersection point;

a hardware processor that determines color information about the measurement object at the intersection point on the basis of a first measurement value of the first light-receiving part and a second measurement value of the second light-receiving part; and an opposing wall that opposes the measurement object when the measurement object is to be measured, wherein the opposing wall includes: an opposing wall main body in which the measurement opening is formed; and an abutting part that is formed in the opposing wall main body so as to protrude from the opposing wall main body toward a side of the measurement object to be opposed and abuts the measurement object when the measurement object is measured, and the abutting part includes:
  a pair of first abutting parts are formed in an arcuate surface shape constituted by a part of a circumferential surface of a columnar body with a first-abutting-part connection line set as an axis, disposed on two sides of the measurement opening so as to flank the measurement opening; and
  a pair of second abutting parts formed in an arcuate surface shape constituted by a part of a circumferential surface of a cylindrical body with a center orthogonal line orthogonal to the first-abutting-part connection line through a center point of the first-abutting-part connection line set as an axis and disposed on an orthogonal line that is orthogonal to the first-abutting-part connection line that connects the pair of first abutting parts to each other, the pair of second abutting parts being disposed on two sides of the first-abutting-part connection line so as to flank the first-abutting-part connection line, wherein each abutting part has an arcuate shape, wherein the orthogonal line and the first-abutting-part connection line cross at the intersection point and are arranged at a respective apex of each arcuate-shaped abutting part, wherein the pair of second abutting parts are formed on both sides in a longitudinal direction of the measurement opening to flank a center axis of the measurement opening, wherein the pair of first abutting parts are formed on both sides of the measurement opening in a width direction orthogonal to the longitudinal direction of the measurement opening to flank the center axis of the measurement opening, wherein each of the arcuate abutting parts is convex extending from the mounting wall part and configured to maintain a space between the mounting wall part and the object to be measured.

2. The colorimeter according to claim 1, wherein the second light-receiving part and the first light-receiving part are a single unit.

3. The colorimeter according to claim 1, further comprising:
  one or a plurality of third illumination parts that is disposed in the plane and radiates third illumination light toward the intersection point at a third incident angle different from the first incident angle with respect to the reference line; and
  one or a plurality of fourth illumination parts that is disposed symmetrically with the one or the plurality of third illumination parts in the plane with the reference line as a line of symmetry and radiates fourth illumination light toward the intersection point.

4. The colorimeter according to claim 1, further comprising:
  one or a plurality of third light-receiving parts that is disposed in the plane and receives light from the intersection point by facing the intersection point at a third observation angle different from both of the first observation angle and a second observation angle; and
  one or a plurality of fourth light-receiving parts that is disposed symmetrically with the one or the plurality of third light-receiving parts in the plane with the reference line as a line of symmetry and receives light from the intersection point by facing the intersection point.

5. A colorimeter according to claim 2, wherein
  the first illumination part includes a plurality of first sub-illumination parts that separately radiate first illumination light toward the intersection point at the prescribed first incident angle with respect to the prescribed reference line,
  the second illumination part includes a plurality of second sub-illumination parts that are disposed diametrically opposite to respective first sub-disposing positions of the plurality of first sub-illumination parts with respect to the reference line and symmetrically with the plurality of respective first sub-illumination parts with the reference line as a line of symmetry, and separately radiate second illumination light toward the intersection point, and
  the plurality of first sub-illumination parts and the plurality of second sub-illumination parts are disposed on the same circumference so as to be spaced apart from each other or continuously.

6. The colorimeter according to claim 5, further comprising:
  one or a plurality of third illumination parts including third sub-illumination parts that are disposed in each plane including each of the first sub-disposing positions of the plurality of first sub-illumination parts, the reference line, and each of second sub-disposing positions of the plurality of second sub-illumination parts, and separately radiate third illumination light toward the intersection point at an incident angle different from the first incident angle with respect to the reference line; and
  one or a plurality of fourth illumination parts including a plurality of fourth sub-illumination parts that are disposed symmetrically with the plurality of respective third sub-illumination parts in the each plane with the reference line as a line of symmetry, and separately radiate fourth illumination light toward the intersection point, wherein
the plurality of third sub-illumination parts and the plurality of fourth sub-illumination parts are disposed on the same circumference so as to be spaced apart from each other or continuously.

7. The colorimeter according to claim 2, further comprising:
one or a plurality of third illumination parts that is disposed in the plane and radiates third illumination light toward the intersection point at a third incident angle different from the first incident angle with respect to the reference line; and
one or a plurality of fourth illumination parts that is disposed symmetrically with the one or the plurality of third illumination parts in the plane with the reference line as a line of symmetry and radiates fourth illumination light toward the intersection point.

8. The colorimeter according to claim 1,
wherein the pair of first abutting parts are formed in an arcuate surface shape constituted by a part of a circumferential surface of a columnar body centered around a first-abutting-part connection line, and
wherein the pair of second abutting parts are formed in an arcuate surface shape constituted by a part of the circumferential surface of a columnar body centered around a center orthogonal line.

9. A colorimeter that performs colorimetry of a measurement object, the colorimeter comprising:
a first illumination part that radiates first illumination light toward an intersection point between an opening plane of a measurement opening, wherein the measurement opening has a long-hole shape, and a prescribed reference line intersecting with the opening plane, at a prescribed first incident angle with respect to the reference line;
a second illumination part that is disposed diametrically opposite to a first disposing position of the first illumination part with respect to the reference line and symmetrically with the first illumination part with the reference line as a line of symmetry, and radiates second illumination light toward the intersection point;
a first light-receiving part that is disposed in a plane including the first disposing position of the first illumination part, the reference line, and a second disposing position of the second illumination part, and receives light from the intersection point by facing the intersection point at a prescribed first observation angle with respect to the reference line;
a second light-receiving part that is disposed symmetrically with the first light-receiving part in the plane with the reference line as a line of symmetry, and receives light from the intersection point;
a hardware processor that determines color information about the measurement object at the intersection point on the basis of a first measurement value of the first light-receiving part and a second measurement value of the second light-receiving part; and
an opposing wall that opposes the measurement object when the measurement object is to be measured, wherein
the opposing wall includes: an opposing wall main body in which the measurement opening is formed; and an abutting part that is formed in the opposing wall main body so as to protrude from the opposing wall main body toward a side of the measurement object to be opposed and abuts the measurement object when the measurement object is measured, and
the abutting part includes:
a pair of first abutting parts are formed in an arcuate surface shape constituted by a part of a circumferential surface of a cylindrical body with a first-abutting-part connection line set as an axis and disposed on two sides of the measurement opening so as to flank the measurement opening;
a pair of second abutting parts disposed on an orthogonal line parallel to a center orthogonal line with a distance interposed therebetween, on two sides of the first-abutting-part connection line that connects the pair of first abutting parts to each other so as to flank the first-abutting-part connection line, the center orthogonal line passing through a middle point of the first-abutting-part connection line and is orthogonal to the first-abutting-part connection line; and
a pair of third abutting parts disposed symmetrically with the pair of second abutting parts with respect to the center orthogonal line,
wherein the first abutting parts have an arcuate shape,
wherein the orthogonal line and the first-abutting-part connection line cross at the intersection point and are arranged at a respective apex of each arcuate-shaped abutting part,
wherein the pair of first abutting parts are formed as a pair on both sides of the measurement opening in a longitudinal direction of the measurement opening to flank a center axis of the measurement opening,
wherein the pair of second abutting parts and the pair of third abutting parts are respectively formed on both sides of the measurement opening in a width direction orthogonal to the longitudinal direction of the measurement opening to flank the center axis of the measurement opening,
wherein each of the arcuate abutting parts is convex extending from the mounting wall part and configured to maintain a space between the mounting wall part and the object to be measured.

10. The colorimeter according to claim 9, wherein the second light-receiving part and the first light-receiving part are a single unit.

11. The colorimeter according to claim 9, further comprising:
one or a plurality of third illumination parts that is disposed in the plane and radiates third illumination light toward the intersection point at a third incident angle different from the first incident angle with respect to the reference line; and
one or a plurality of fourth illumination parts that is disposed symmetrically with the one or the plurality of third illumination parts in the plane with the reference line as a line of symmetry and radiates fourth illumination light toward the intersection point.

12. The colorimeter according to claim 9, further comprising:
one or a plurality of third light-receiving parts that is disposed in the plane and receives light from the intersection point by facing the intersection point at a third observation angle different from both of the first observation angle and a second observation angle; and
one or a plurality of fourth light-receiving parts that is disposed symmetrically with the one or the plurality of third light-receiving parts in the plane with the reference line as a line of symmetry and receives light from the intersection point by facing the intersection point.

13. The colorimeter according to claim 9, wherein the pair of first abutting parts are formed in an arcuate surface shape constituted by a part of a circumferential surface of a columnar body centered around the first abutting-part connection line.

14. A colorimeter that performs colorimetry of a measurement object, the colorimeter comprising:
- a first illumination part that radiates first illumination light toward an intersection point between an opening plane of a measurement opening, wherein the measurement opening has a long-hole shape, and a prescribed reference line intersecting with the opening plane, at a prescribed first incident angle with respect to the reference line;
- a second illumination part that is disposed diametrically opposite to a first disposing position of the first illumination part with respect to the reference line and symmetrically with the first illumination part with the reference line as a line of symmetry, and radiates second illumination light toward the intersection point;
- a first light-receiving part that is disposed in a plane including the first disposing position of the first illumination part, the reference line, and a second disposing position of the second illumination part, and receives light from the intersection point by facing the intersection point at a prescribed first observation angle with respect to the reference line;
- a second light-receiving part that is disposed symmetrically with the first light-receiving part in the plane with the reference line as a line of symmetry, and receives light from the intersection point;
- a hardware processor that determines color information about the measurement object at the intersection point on the basis of a first measurement value of the first light-receiving part and a second measurement value of the second light-receiving part; and
- an opposing wall that opposes the measurement object when the measurement object is to be measured, wherein
- the opposing wall includes: an opposing wall main body in which the measurement opening is formed; and an abutting part that is formed in the opposing wall main body so as to protrude from the opposing wall main body toward a side of the measurement object to be opposed and abuts the measurement object when the measurement object is measured, and
- the abutting part includes: a pair of first abutting parts are formed in an arcuate surface shape constituted by a part of a circumferential surface of a cylindrical body with a first-abutting-part connection line set as an axis and disposed on two sides of the measurement opening so as to flank the measurement opening; and a pair of second abutting parts formed in an arcuate surface shape constituted by a part of a circumferential surface of a cylindrical body with a center orthogonal line orthogonal to the first-abutting-part connection line through a center point of the first-abutting-part connection line set as an axis and disposed on the orthogonal line that is orthogonal to the first-abutting-part connection line that connects the pair of first abutting parts to each other, the pair of second abutting parts being disposed on two sides of the first-abutting-part connection line so as to flank the first-abutting-part connection line,
- wherein each abutting part has an arcuate shape,
- wherein the orthogonal line and the first-abutting-part connection line cross at the intersection point and are arranged at a respective apex of each arcuate-shaped abutting parts,
- wherein the pair of first abutting parts are formed in an arcuate surface shape constituted by a part of a circumferential surface of a columnar body centered around the first-abutting-part connection line, and
- wherein the pair of second abutting parts are formed in an arcuate surface shape constituted by a part of the circumferential surface of a columnar body centered around a center orthogonal line,
- wherein each of the arcuate abutting parts is convex extending from the mounting wall part and configured to maintain a space between the mounting wall part and the object to be measured.

15. A colorimeter that performs colorimetry of a measurement object, the colorimeter comprising:
- a first illumination part that radiates first illumination light toward an intersection point between an opening plane of a measurement opening, wherein the measurement opening has a long-hole shape, and a prescribed reference line intersecting with the opening plane, at a prescribed first incident angle with respect to the reference line;
- a second illumination part that is disposed diametrically opposite to a first disposing position of the first illumination part with respect to the reference line and symmetrically with the first illumination part with the reference line as a line of symmetry, and radiates second illumination light toward the intersection point;
- a first light-receiving part that is disposed in a plane including the first disposing position of the first illumination part, the reference line, and a second disposing position of the second illumination part, and receives light from the intersection point by facing the intersection point at a prescribed first observation angle with respect to the reference line;
- a second light-receiving part that is disposed symmetrically with the first light-receiving part in the plane with the reference line as a line of symmetry, and receives light from the intersection point;
- a hardware processor that determines color information about the measurement object at the intersection point on the basis of a first measurement value of the first light-receiving part and a second measurement value of the second light-receiving part; and
- an opposing wall that opposes the measurement object when the measurement object is to be measured, wherein
- the opposing wall includes: an opposing wall main body in which the measurement opening is formed; and an abutting part that is formed in the opposing wall main body so as to protrude from the opposing wall main body toward a side of the measurement object to be opposed and abuts the measurement object when the measurement object is measured, and
- the abutting part includes: a pair of first abutting parts are formed in an arcuate surface shape constituted by a part of a circumferential surface of a cylindrical body with a first-abutting-part connection line set as an axis and disposed on two sides of the measurement opening so as to flank the measurement opening; a pair of second abutting parts formed in an arcuate surface shape constituted by a part of a circumferential surface of a cylindrical body with a center orthogonal line orthogonal to the first-abutting-part connection line through a center point of the first-abutting-part connection line set as an axis and disposed on an orthogonal line parallel to the center orthogonal line with a distance interposed therebetween, on two sides of a first-abutting-part connection line that connects the pair of first abutting parts to each other so as to flank the first-abutting-part connection line, the center orthogonal line passing through a middle point of the first-abutting-part connection line and is orthogonal to the first-abutting-part connection line; and a pair of third abutting parts disposed symmetrically with the pair of third abutting parts with respect to the center orthogonal line, wherein each abutting part has an arcuate shape, wherein the orthogonal line and the first-abutting-part connection line cross at the intersection point and are arranged at a respective apex of each arcuate-shaped abutting part, wherein the pair of first abutting parts are formed in an arcuate surface shape constituted by a part of a circumferential surface of a columnar body centered around the first abutting-part connection line, wherein each of the arcuate abutting parts is convex extending from the mounting wall part and configured to maintain a space between the mounting wall part and the object to be measured.

* * * * *